US012208413B2

(12) United States Patent
Pugh et al.

(10) Patent No.: US 12,208,413 B2
(45) Date of Patent: Jan. 28, 2025

(54) METHOD AND APPARATUS FOR IMPROVED TUMBLER SUPPORT

(71) Applicants: Zoey Pugh, Orange Park, FL (US); Randall Pugh, Jacksonville, FL (US)

(72) Inventors: Zoey Pugh, Orange Park, FL (US); Randall Pugh, Jacksonville, FL (US)

( * ) Notice: Subject to any disclaimer, the term of this patent is extended or adjusted under 35 U.S.C. 154(b) by 0 days.

(21) Appl. No.: 18/410,941

(22) Filed: Jan. 11, 2024

(65) Prior Publication Data

US 2024/0149293 A1 May 9, 2024

Related U.S. Application Data

(63) Continuation-in-part of application No. 18/081,187, filed on Dec. 14, 2022, now Pat. No. 11,911,788.

(60) Provisional application No. 63/289,190, filed on Dec. 14, 2021.

(51) Int. Cl.
*B05C 13/02* (2006.01)

(52) U.S. Cl.
CPC .................................... *B05C 13/02* (2013.01)

(58) Field of Classification Search
CPC .............................. B05C 13/025; B05C 13/02
USPC ...................................................... 269/47–52
See application file for complete search history.

(56) References Cited

U.S. PATENT DOCUMENTS

| | | | |
|---|---|---|---|
| 1,235,957 | A | 8/1917 | Bidwell |
| 1,245,361 | A | 11/1917 | Lutz |
| 1,413,680 | A | 4/1922 | Pfunder |
| 1,688,424 | A | 10/1928 | Kiefer |
| 2,167,589 | A | 7/1939 | Schutz |
| 2,198,565 | A | 4/1940 | Schutz et al. |
| 2,215,981 | A | 9/1940 | Schutz |
| 2,529,331 | A | 11/1950 | Ellis et al. |
| 3,328,042 | A | 6/1967 | Mallory |
| 4,267,771 | A | 5/1981 | Stirbis |
| 4,380,964 | A | 4/1983 | Abe et al. |
| 4,601,222 | A | 7/1986 | Gill |
| 4,926,788 | A | 5/1990 | Metcalf |
| 5,284,229 | A | 2/1994 | Logan et al. |

*Primary Examiner* — Jason L Vaughan
(74) *Attorney, Agent, or Firm* — Joseph P. Kincart; Tracnik Law PLLC

(57) ABSTRACT

Improved methods and apparatus to quickly and securely fasten a tumbler cup to a spindle turner arm in a consistent and accurate manner. A spindle tumbler arm is inserted into a support body and contacts one or more cams. The cams move a plunger outward forcing a seal against a wall of an interior change securing turner arm against to the tumbler cup. Other embodiments include an expandable bladder placed into the tumbler cup, thereby providing enhanced stability and support; and a threaded support attached via a threaded connection. The expandable bladder and/or the threaded support in such embodiments may also incorporate an internal plunger-cam mechanism, enhancing their functionality and adaptability for diverse tumbler customization needs.

20 Claims, 18 Drawing Sheets

METHOD AND APPARATUS FOR IMPROVED TUMBLER SUPPORT

CROSS REFERENCE TO RELATED APPLICATIONS

This application claims priority to U.S. Non-Provisional application Ser. No. 18/081,187, filed Dec. 14, 2022, entitled METHOD AND APPARATUS FOR IMPROVED TUMBLER SUPPORT, which claims the benefit of Provisional Application No. 63/289,190 filed Dec. 14, 2021, entitled METHOD AND APPARATUS FOR IMPROVED TUMBLER SUPPORT, the entire disclosures of each of which are incorporated herein by reference.

FIELD OF THE DISCLOSURE

The present invention relates to methods and apparatus for improved support and handling of a drinkware, particularly tumblers. More specifically, the invention provides improved methods and apparatus for securely and precisely supporting a tumbler while the tumbler is being rotated for the application of decorative coatings or another customization.

BACKGROUND OF THE DISCLOSURE

The lidded tumbler market is expanding as users look for green options that do not result in the generation of waste that enters landfills or negatively impacts climate change variables. The U.S. market for tumblers is on track to reach a billion dollars annually by 2023. Younger people in particular seem inclined to use tumblers during various outdoor activities such as camping, hiking, fitness, and travel. The younger demographic is also eager to be expressive and therefore use customized tumblers that help them declare themselves. In another aspect, promotional tumblers are used to reach potential customers during non-blue light hours (hours during which the customer is not engaged in online activities). Accordingly, tumblers may have customized prints, logos, and messages.

Tumblers may have various shapes, including different interior volume shapes, and may include various materials, such as stainless steel, aluminum, plastic, glass, double-walled vacuum, coatings, and the like. Stainless steel tumblers are increasingly growing in popularity due to a variety of reasons. They are known for their durability and resistance to rust and corrosion, making them a long-lasting option compared to other materials. These tumblers often have excellent insulation properties, keeping beverages hot or cold for extended periods. Customization of the various shapes requires that the tumbler be securely supported and often rotated during the customization processes. Secure support ensures that the tumbler stays in place, allowing for precise application of designs, whether they are being engraved, printed, or painted. Securely holding the tumbler in place is important for safety, especially when using tools like engravers or lasers.

Currently, the apparatus used for support of the tumbler during customization work is not precise in its ability to align and/or rotate the tumbler with a support shaft during customization processes. Typical support mechanisms are simply a piece of foam stuck onto a piece of pipe which provides inconsistent support and sometimes results in the tumbler becoming dislodged such that the artwork on the tumbler is compromised. In other scenarios, it is difficult to replicate a design due to inconsistencies in the support.

Thus, there is a need for an improved tumbler support apparatus that can offer enhanced stability, precise alignment, and adaptability to various tumbler designs, ultimately contributing to the efficiency and safety of the customization process. Such an apparatus would represent a significant advancement in the field of tumbler customization, meeting both the artistic needs of designers and the practical demands of manufacturers and consumers alike.

SUMMARY OF THE DISCLOSURE

Accordingly, the present invention provides methods and apparatus to quickly and securely fasten a tumbler cup to a spindle turner arm in a consistent and accurate manner.

Embodiments may include a handle that fixedly attaches to a spindle turner arm and a tumbler cup. In some embodiments, the handle may attach to a rim of the tumbler cup, such as via a threaded portion abutting the rim. The threaded portion may be an interior thread or an exterior thread depending upon the design of the tumbler cup and the spindle turner may be inserted into a concentric opening through the handle. The spindle turner may be secured with a set screw or other fastening device.

In some embodiments, the handle portion may be placed into an interior chamber of a tumbler cup while the handle is in an inactive state. The spindle turner arm can be inserted into the handle. As the turner arm is inserted into the handle, plungers contained within plunger channels in the handle are transitioned to an active state and moved outward towards an interior chamber surface of the tumbler.

In some preferred embodiments, seals, such as for example, silicon beads, are pushed by the plungers outwards against the interior chamber surface thereby fixedly attaching the handle to the interior chamber surface. The spindle turner arm is attached to the handle, and the handle is fixedly attached to the tumbler while the handle is within the interior chamber and in an active state, the spindle is also fixedly attached to the tumbler while the handle is within the interior chamber and in an active state.

By removing the spindle turner arm, the handle may be placed back into an inactive state and disengaged from the tumbler and removed from the interior chamber. In this state, the components that previously expanded to secure the tumbler, such as plungers, retract thereby releasing their grip on the tumbler's interior surface.

In general, the present invention provides for a tumbler cup support apparatus that includes a tumbler support body having a cylindrical hollow into which a spindle turner arm may be inserted. The plunger may be supported by the tumble support body. The plunger may include a first plunger end directed towards the cylindrical hollow and a second plunger end directed towards a perimeter of the tumbler support body. A cam may be integrated into the first plunger end, the cam being placed in contact with the spindle turner arm when the spindle turner arm is inserted into the cylindrical hollow.

A formable interface may be in contact with the second plunger surface and movable against a surface of an interior chamber of a tumbler cup.

Implementations may include one or more of the following features: a tumbler cup support apparatus additionally having a set screw through the tumbler support body, the set screw adjustable to secure the spindle turner arm to the tumbler support body; the formable interface may include a silicon sphere; a gasket between tumbler support body and the tumbler cup; the tumbler support body may include an upper portion and a lower portion, the lower portion encompassing the plunger and the silicon sphere. The lower portion of the tumbler support body may be fixedly attached to the upper portion of the tumbler support body, such as for example with one or more threaded connectors.

The cam integrated into the first plunger end and the formable interface in contact with the second plunger surface may be replaced with a bladder. This bladder, possibly made of a flexible and durable material such as silicone or rubber, is designed to expand and contract within the tumbler support apparatus. When the spindle turner arm is inserted into the apparatus, it interacts with the bladder system. As the arm is pushed in, the bladder expands outward, exerting a uniform pressure against the interior surface of the tumbler.

Methods of the present invention may include supporting a tumbler cup in a tumbler support body and plunger into an interior chamber of the tumbler cup. Supporting may include positioning a seal between the plunger and a surface of the interior chamber. Supporting may furthermore include inserting the spindle turner arm through a cylindrical hollow in the tumbler support body. The cam may contact the spindle turner arm.

Supporting may moreover include pushing the spindle turner arm past the cam causing the plunger to move outward towards a surface of the interior chamber. The plunger may be extended outward, deploying the plunger into an active state, and placing the seal into contact with the surface of the interior chamber. Supporting may furthermore include rotating the spindle turner arm, and as a result of the rotating the spindle turner arm, transferring rotational force to the tumbler cup.

In some embodiments, a minimal amount of outward force may be exerted with the plunger such that the seal is placed in contact with the surface of the interior chamber.

The plungers may be removed from an active state by removing the spindle turner arm from the tumbler support body; and reducing the amount of outward force by the seals in contact with the surface of the interior chamber. In some embodiments, each plunger and a respective cam are integrated to each other creating a unified component within the tumbler support apparatus. This integration streamlines the internal mechanism, reducing the number of separate moving parts and thus the potential for mechanical failure. With the plunger and cam functioning as a single unit, the force applied to the plunger is more direct and controlled, enhancing the precision with which the plunger extends and retracts. This consolidated design may allow for a smoother transition as the spindle turner arm engages with the cam, causing the integrated plunger to deploy outward towards the tumbler's interior surface.

A cam may include a slope surface and the method may include contacting the slope surface with the spindle turner arm and moving the cam outward towards the surface of the interior chamber as a result of the contact of the slope with the spindle turner arm. The tumbler support body may be connected to a handle and the method may additionally include the step of securing the spindle turner arm to the handle and the tumbler support body with a fastener.

In some embodiments, a tumbler cup support apparatus may be designed to optimize the stabilization and handling of tumbler cups for customization. The tumbler cup support apparatus may comprise a tumbler support body featuring a cylindrical hollow extending from a top portion to a bottom portion of the support body. A spindle turner arm can be inserted into the cylindrical hollow, aligning with the central axis of the support body.

Additionally, a stem may extend from the bottom portion of the tumbler support body, designed to be in the same plane as the cylindrical hollow, enhancing the stability and alignment of the tumbler cup support apparatus. The tumbler support body may comprise at least one plunger mechanism. Each of these plunger mechanisms supports one or more plungers, where each plunger has a first end directed towards the cylindrical hollow and a second end directed towards the perimeter of the support body.

Furthermore, each plunger mechanism may house one or more formable interfaces (or seals) where one of the formable interfaces is in contact with one of the plungers within each such plunger mechanism. Integrated into one of the plungers in each plunger mechanism is a cam, crucial for the activation and deactivation of the plungers. When the spindle turner arm is rotated or moved through the cylindrical hollow, it interacts with the cam, causing the plungers to extend outwards, thereby causing the formable interfaces (or seals) to grip on the tumbler cup.

In some embodiments, the tumbler cup support apparatus may comprise at least one cam designed with a sloped surface. The method of supporting the tumbler cup may include the step of contacting this slope surface with a spindle turner arm, which also comprises a second slope surface. When the spindle turner arm is inserted into a cylindrical hollow of the tumbler support body, its slope surface comes into contact with the slope surface of the at least one cam.

As a result of this contact between the two slope surfaces, the cam is driven outward towards the interior surface of the tumbler cup's interior chamber. The slope-to-slope contact between the slope surfaces on the cam and the spindle turner arm facilitates a smooth and controlled outward movement and deployment of the plunger-mechanism.

In some embodiments, the method may include the step of reproducing a tumbler cup support experience via aligning the tumbler support body to the handle with reference to alignment marks on the handle. Additionally, the methods may include placing a gasket between the tumbler support body and the tumbler cup.

A tumbler support body may include an upper portion and a lower portion, the lower portion encompassing the plunger and the cam, and the method may further include securing the lower portion to the upper portion with one or more screws.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

Figure 1:
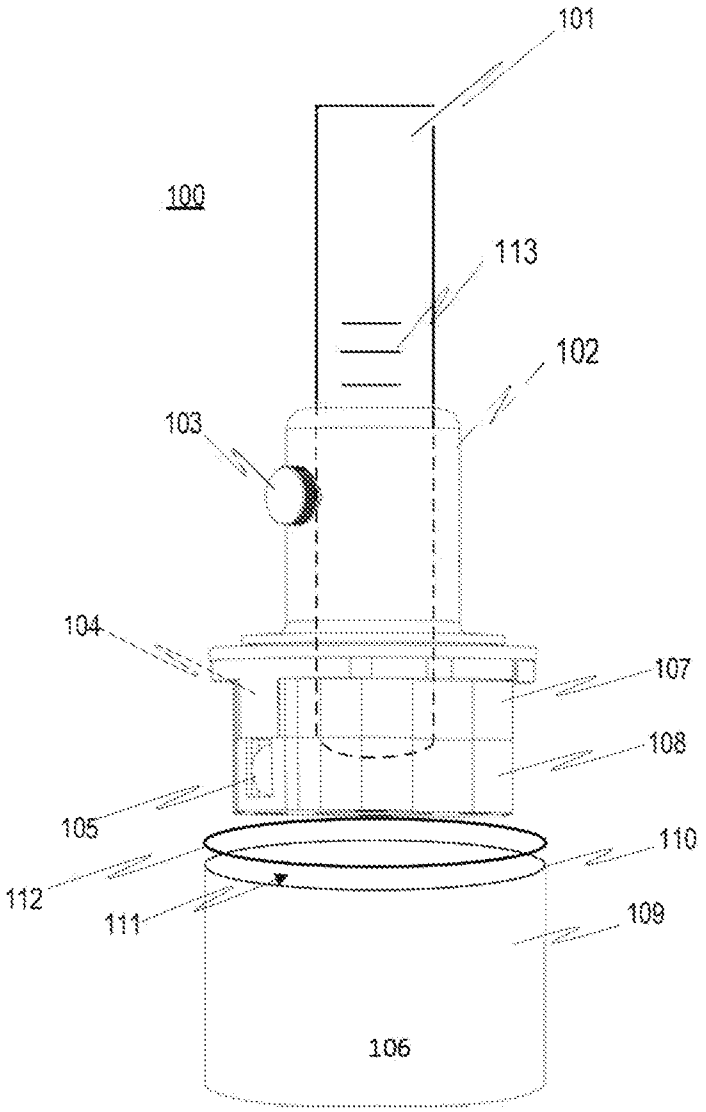
FIG. 1 illustrates an exploded view of an apparatus in accordance with some embodiments of the present invention.

The drawings are not necessarily drawn to scale unless clearly indicated otherwise. Dimensions, where shown, are typical dimensions in units of inches.

DETAILED DESCRIPTION

The present invention provides for apparatus and methods to hold a tumbler cup securely and consistently in a manner that permits rotation of the tumbler and repeatable handling of similar tumbler cups.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood, the examples do not limit the broadness of the aspects of the underlying disclosure.

Embodiments in accordance with the present disclosure provide methods and apparatus for consistent and secure attachment of a spindle turner arm to a tumbler cup via a handle that is securable to the tumbler cup via a mechanism appropriate to a particular cup design.

Preferably the handle includes a receiving via or other void to receive in a spindle turner arm and secures the spindle turner arm to the handle with a set screw or other quick-release fastening mechanism.

In some preferred embodiments, the present invention includes a handle that is secured to the tumbler cup by threading the handle onto a threaded portion of the tumbler cup. Typically, the threaded portion of the tumbler cup is suitable for securing a cap onto the tumbler cup. The threaded portion may include internal or external threads.

In other preferred embodiments, a handle is inserted into an interior chamber of the tumbler cup and extends plungers outward from the handle to contact the surface of the interior chamber. In some embodiments, ends of the plungers that extend outwards may include seals, such as silicon spheres that are compressed against the interior surface thereby creating a secure bond between the handle and the tumbler cup.

Still further, in some embodiments, the plungers may be user-replaceable. A user may select an appropriate size plunger to exert a desired amount of pressure by the plunger against the surface of the interior chamber. A "size" of a plunger may include one or both of a length of the plunger and a surface area of the end of the plunger that extends into contact with the surface of the interior chamber, either with or without a seal.

In another aspect, in some embodiments, the plungers may be associated with a cam that is acted upon by the spindle turner arm. As the turner arm is inserted into the concentric via for receiving the turner arm, the turner arm will come into contact with the cam and as the turner arm continues into the handle, the cam will rotate and force the plunger outward towards the interior chamber surface. Preferably the outward-facing end of the plunger will support a seal, such as a volume of silicone that will be compressed between the plunger and the surface of the interior chamber and thereby prevent the plunger from moving along the surface of the interior chamber as the handle is turned by the spindle turner arm.

A speed of rotation of a spindle turner arm may vary according to a procedure being performed upon the tumbler cup. Typically, the speed will be between 1 and 5 rotations per minute, with 3 rotations per minute being preferred for many procedures.

A number of plungers used to secure the handle may vary according to a design of a plunger body. Preferred embodiments include between 2 and 6 plungers, although 1 plunger is within the scope of the present invention and more than 6 plungers is also within the scope of the present invention (such as a radial spoke design).

FIG. 1 shows an assembled schematic view of a tumbler apparatus 100 illustrating some embodiments of the present invention. A spindle turner arm 101 is shown inserted into a handle 102 and fixedly attached to and secured in place with a handle securing device 103. The handle 102 is removably attachable to a tumbler cup 109. The tumbler cup 109 will include an end with a tumbler cup opening 110. The handle 102 is insertable into the tumbler cup opening 110 and removably attached to a surface of an interior chamber 111.

One modality of removably attaching the handle 102 to the tumbler cup 109 includes exerting outward pressure on the interior chamber 111 with a formable interface 105, such as, for example, a silicon sphere.

As illustrated, the handle securing device 103 includes a set screw, such as a thumb screw. Other securing devices are within the scope of the present invention such as, for example, a friction seal, a spring-loaded mechanism, a pawl and detent, a magnet, or other mechanical or electromechanical mechanism that may be operated by a user to fixedly attach the spindle turner arm 101 to the handle 102 types, and preferably also detach the spindle turner arm 101 from the handle 102 in response to a subsequent action by the user.

In some preferred embodiments, a gasket 112 may be used to prevent the handle 102 from being adhered to the tumbler cup 109 with one or more of the coatings applied to the tumbler cup 109 during processing while the cup 109 is on the turner arm 101. Embodiments may also include a lubricant in place of, or in addition to the gasket 112. Lubricants may include, for example, a grease, silicon, or other "wet" substance, or a dry lubricant, such as a graphite or powder type lubricant that eases separation of the handle 102 from the tumbler cup 109.

A plunger body 108 may include an upper portion 107 and a lower portion 108 which may be fastened together with a fastener (not illustrated in FIG. 1), such as a snap, threaded bolt, rivet, magnet, or other known fastener 103. The fastener 103 may be received by a threaded knurl or other receptacle. The handle 102 will be secured against an interior surface 106 of the tumbler cup 109.

With the handle 102 secured against the interior surface 106 of the tumbler cup 109, the spindle turner arm 101 is preferably fixedly secured to the tumbler cup 109, in a position concentric to a center of a diameter of the tumbler cup 109, such that any movement of the handle 102 and spindle turner arm 101 causes a corresponding movement of the tumbler cup 109. Movement may include, for example, rotational movement of the spindle turner arm 101 resulting in rotation of the tumbler cup 109, arcuate movement of the spindle turner arm 101 resulting in arcuate movement of the tumbler cup 109, linear movement of the spindle turner arm 101 resulting in linear movement of the tumbler cup 109, or any combination of movement types wherein a movement of the tumbler cup 109 results in a corresponding movement of the tumbler cup.

In preferred embodiments of the present invention, a position of the spindle turner arm 101 in relation to a tumbler cup 109 is repeatable between the spindle turner arm 101 (or a similar spindle arm 101) and the tumbler cup 109 (or a similar tumbler cup 109). In some embodiments, positioning of the spindle turner arm 101 in relation to a tumbler cup 109 may be aided with alignment marks 113 on one or more of the spindle turner arm 101, the handle 102, the tumbler support body 104, and the tumbler cup 109.

Figure 2:
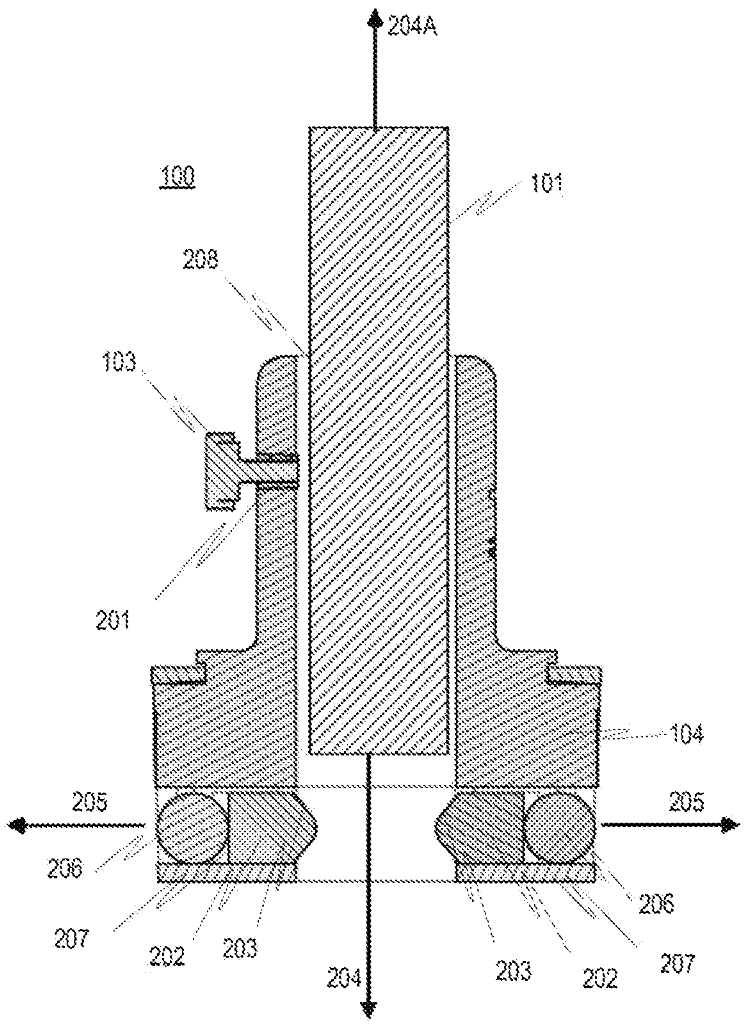
FIG. 2 illustrates a cutaway view of aspects included in the apparatus of the present invention.

Referring now to FIG. 2 illustrates a cut-away view of a tumbler support 100 illustrates a spindle turner arm 101 inserted into a tumbler support body 104. A cylindrical hollow 208 is formed through the tumbler support body 104. Preferably the cylindrical hollow 208 is concentric with the tumbler support body 104. As the spindle turner arm 101 is sufficiently moved in an inward direction 204 through the cylindrical hollow 208, the spindle turner arm 101 will contact one or more plungers 202. The plungers 202 may include a cam surface 203, such as a sloped or arcuate surface. Movement of the spindle turner arm 101 against the cam surface 203 will move the plunger 202 in an outward direction 205. Movement of the spindle arm 101 in an outward direction 204A, will release pressure against the cam 203 and relax pressure against the plunger 202 (as illustrated, release outward force 205).

One or both of: a degree of sloped area on the cam surface 203; and a length of sloped area on the cam surface 203 may be used to determine and/or adjust an amount of movement of the plunger 202 in an outward direction 205 as the spindle turner arm 101 moves past the cam surface 203.

In preferred embodiments, movement of plunger 202 in an outward direction 205 as the spindle turner arm 101 moves past the cam surface 203 causes a plunger surface 207 or a formable interface 206 to contact a surface of an interior chamber (see FIG. 1 item 111). The formable surface may include, by way of non-limiting example, a silicon sphere or other composition that will move against the surface of the interior chamber and lock the plunger body in place relative to the tumbler cup. The presence of the spindle turner arm 101 against the cam surface 203 provides sufficient outward 205 force to maintain the relative positions of the tumbler cup 109, the tumbler support body 104 and the spindle turner arm 101 so that the tumbler cup 109, the tumbler support body 104 and the spindle turner arm 101 may be moved and manipulated as if they were a single contiguous item.

A set screw 103 may extend through a set screw aperture 201 such that the set screw (illustrated as a knurled screw) may be rotated until it contacts the spindle turner arm and fixedly secures the spindle turner arm to the tumbler support body 104.

In some embodiments of the invention, the tumbler support apparatus 100 may be equipped with a modular plunger mechanism that features adjustable extensions. This design element allows for significant customization to accommodate a diverse array of tumbler sizes and shapes. Each plunger 202 within the mechanism can be extended or retracted to precisely conform to the specific contours and dimensions of the tumbler being secured. This adjustability of the plunger 202 can be achieved through various means such as telescopic segments, screw-based adjustment systems, spring-based adjustment systems, or sliding mechanisms integrated within each plunger. This adaptability may ensure that tumblers, regardless of their unique profiles—whether they have a tapered shape, straight sides, or any other distinctive design—can be securely and snugly fitted into the support apparatus 100.

Telescopic segments of the plunger refer to a design where the plunger consists of multiple segments that slide into each other, similar to the sections of a telescope. This allows the plunger length to be easily adjusted by extending or retracting these segments. In the context of the tumbler support apparatus, this would enable the user to modify the length of each plunger to fit the size of the tumbler.

Screw-cased adjustment systems may use threaded screws to adjust the length or position of the plungers. By turning a screw, the plunger can be extended or retracted to the desired length. This precise adjustment mechanism is particularly useful for fine-tuning the fit of the plunger against the tumbler's surface. In some embodiments of the invention, one or more screws attached to such plungers can be tightened or loosened from the exterior of the tumbler support apparatus to adjust the plunger length to fit the size of the tumbler. Similarly, in spring-based adjustment systems, springs may be used to provide or regulate the tension and position of the plungers against the interior surface of the tumbler.

In some embodiments of the invention, the modularity aspect of the plunger mechanism further enhances its versatility. Components of the plunger mechanism can be swapped out or reconfigured depending on the specific requirements of the tumbler. For instance, plungers 202 with different lengths, diameters, or end fittings can be utilized to provide optimal support for a wide range of tumbler designs. This adaptability allows users to customize the number of plungers engaged, ensuring optimal support for tumblers of varying sizes and shapes. For larger or uniquely shaped tumblers that require additional stability, extra plungers 202 can be easily added to the mechanism, thereby distributing the support more evenly around the tumbler's circumference. Conversely, for smaller or more standard-sized tumblers, fewer plungers may be necessary. This multi-plunger configuration not only enhances the versatility of the apparatus but also ensures that each tumbler, regardless of its dimensions, receives precisely the right amount of support and grip necessary for effective and secure customization.

To ensure enhanced stability during the customization process, such as when applying decorative coatings or engravings, the plungers exert an even and controlled pressure against the tumbler's surface. This stable grip prevents any unwanted movement or slippage, thereby facilitating a high-quality and precise customization outcome. The pressure applied by each plunger can be manually adjusted or, in more advanced embodiments, automatically calibrated by the apparatus based on the detected tumbler dimensions.

Moreover, the design of such a modular plunger mechanism prioritizes ease of use and rapid adjustment, allowing for quick changes between different tumblers, which is particularly beneficial in settings where multiple tumblers are being customized in succession. This feature may significantly enhance the efficiency of the customization process, making the apparatus ideal for both high-volume commercial environments and individual artisanal use.

Figure 3:
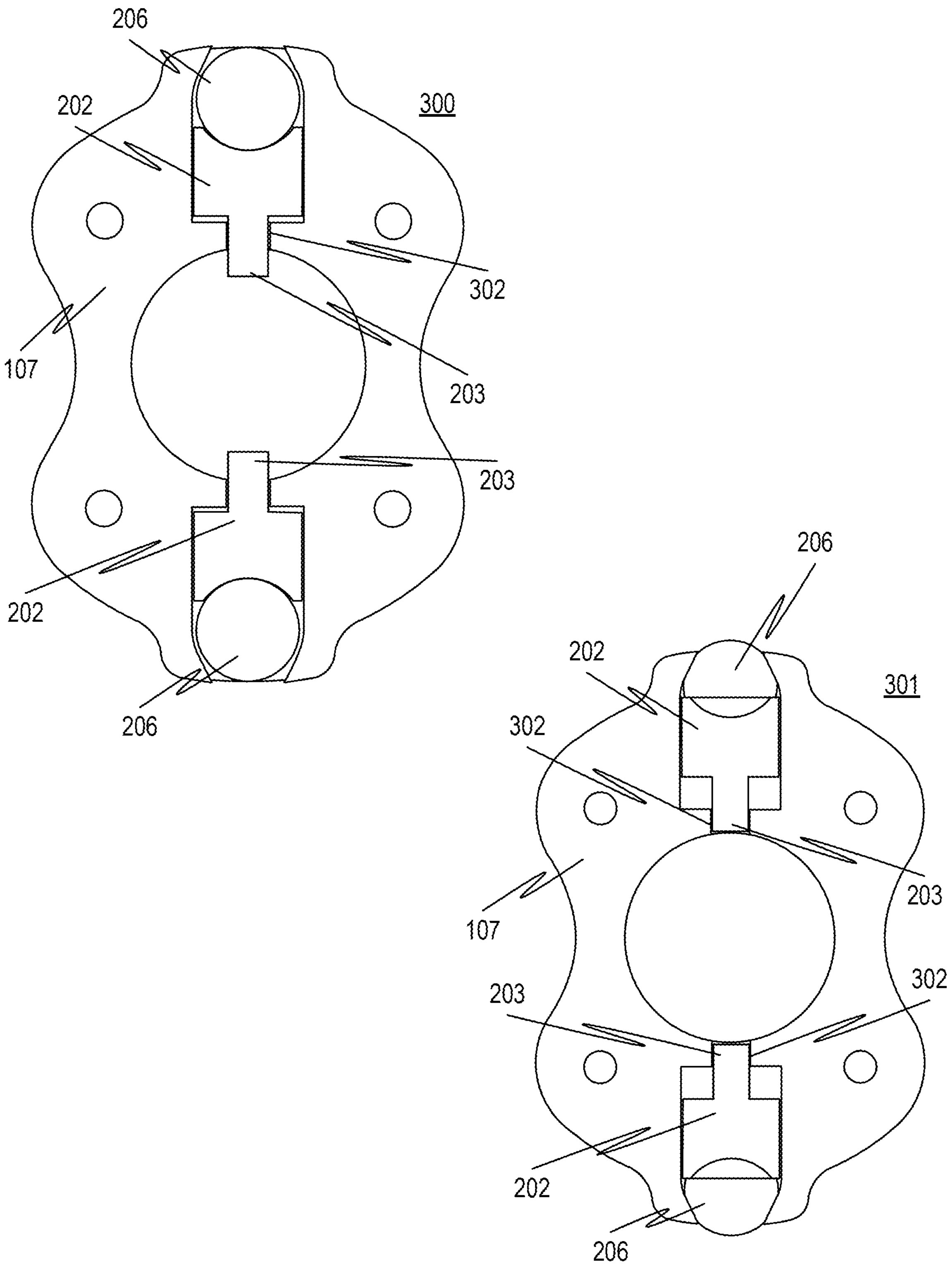
FIG. 3 illustrates a top-down view of a lower portion of the handle with plungers and seals in active and inactive states.

FIG. 3 illustrates a top-down view of a lower portion of the tumbler support body 104. The plungers 202 and corresponding formable interfaces 206 may be in an inactive state 300 or in an active state 301. The inactive state 300 allows the tumbler cup 109, the tumbler support body 104 and the spindle turner arm 101 to move independently of each other. The inactive state 300 refers to the formable interface 206 being retracted within the perimeter of the lower portion of the tumbler support body 104.

The active state 301 fixedly attaches the tumbler cup 109, the tumbler support body 104 and the spindle turner arm 101 to each other and allows the tumbler cup 109, the tumbler support body 104 and the spindle turner arm 101 to be manipulated as a single unit. The active state 301 is indicative of the formable interface 206 being extended outward from the perimeter of the lower portion of the tumbler support body 104.

In some embodiments, the sloped cam surface 203 may be guided by a cam guide 302 to maintain a correct position of the plunger 202 during movement initiated by contact between the plunger and the sloped cam surface 203.

In some embodiments of the invention, the spindle turner arm 101 may be designed with an innovative feature to enhance its interaction with the sloped cam surfaces 203 within the tumbler support apparatus. At the bottom end of the spindle turner arm 101 where it makes contact with the sloped cam surfaces 203, a sloped or beveled surface may be incorporated. This sloped design for the bottom end of the spindle turner arm 101 is intended to facilitate smoother engagement with the sloped cam surfaces 203, leading to a more efficient and controlled movement of the cams 203.

For example, when the spindle turner arm 101 is inserted into the support apparatus, its sloped end seamlessly slides along the sloped cam surfaces 203. This interaction allows for a gradual and precise application of force by the cams 203 onto the plungers 202. As a result of this smooth sliding motion, the plungers 202 are pushed outward with an optimal level of control and consistency. This outward movement of the plungers 202 ensures that they exert the right amount of pressure against the inner surface 106 of the tumbler cup 109, securing it firmly in place. The sloped surface on the spindle turner arm 101 not only enhances the mechanical efficiency of the apparatus but also contributes to reducing wear and tear on the components, particularly the cams 203 and plungers 202. Additionally, the smoother interaction between the spindle turner arm 101 and the cams 203 minimizes the risk of sudden movements or jarring, which could potentially disrupt the precision of the customization process being applied to the tumbler.

Figure 4:
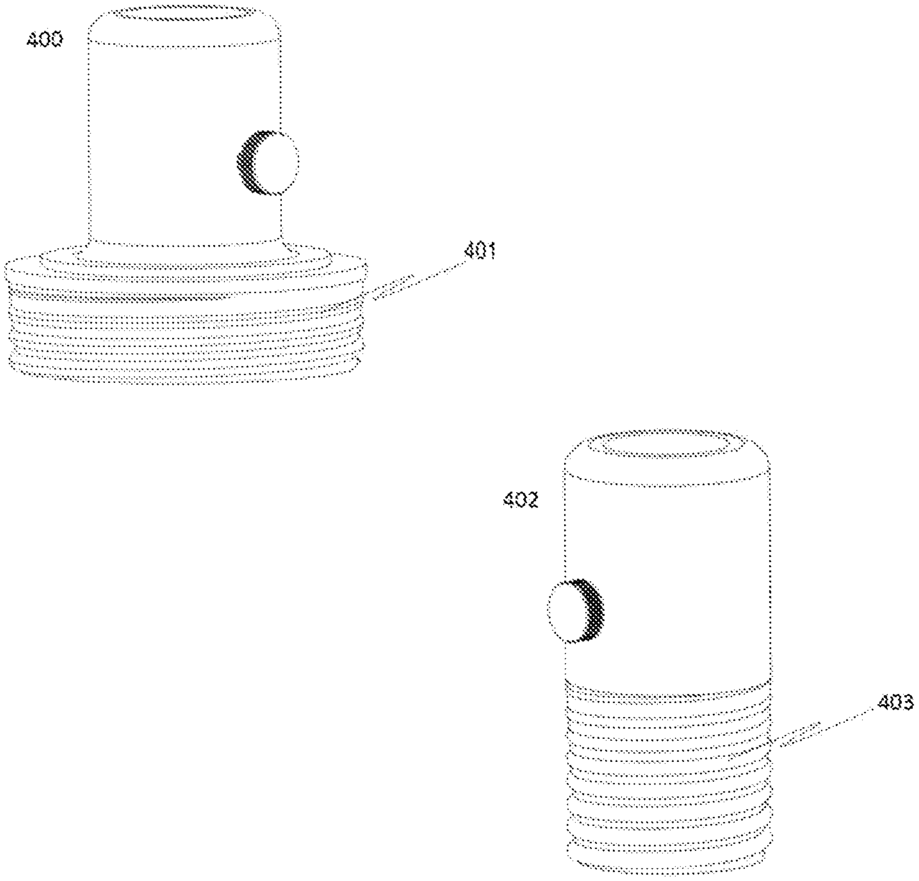
FIG. 4 illustrates a perspective view of wide-mouth tumbler support with an exterior wide mouth handle thread and a bullet tumbler support with an exterior handle thread.

FIG. 4 illustrates a perspective view of wide mouth tumbler support 400 with an exterior wide mouth handle thread 401 and a bullet tumbler support 402 with an exterior handle thread 403. The exterior wide mouth handle thread 401 may be used to removably connect the wide mouth tumbler support 400 to a wide mouth tumbler cup (not shown in FIG. 4). The bullet handle thread 403 may be used to removably connect the bullet tumbler support 402 to a bullet mouth tumbler cup (not shown in FIG. 4). In different embodiments, the wide mouth thread 401 or the bullet mouth handle thread 403 may be used individually or in combination with a plunger apparatus described in FIG. 1 through FIG. 3 to fixedly connect a spindle turner arm 101 (not shown in FIG. 4) with a tumbler cup. When utilized in combination with the plunger apparatus (described in FIG. 1 through FIG. 3), these threaded supports offer an additional layer of stability and security. The threads provide the initial anchoring mechanism, attaching the support body to the tumbler. Subsequently, the plunger mechanism, once activated, further secures the tumbler from the inside. This dual action (external threading coupled with internal plunger support) ensures that the tumbler is held firmly in place, minimizing any risk of slippage or misalignment, especially crucial during precision customization processes such as engraving or detailed printing.

In scenarios where a tumbler cup possesses interior threading, the exterior threaded portion 401 (or 403) may thread or engage into an interior threaded portion of the tumbler cup (not illustrated in FIG. 4) to secure the wide (or bullet) mouth tumbler support to the interior threaded tumbler cup. This engagement provides a strong, screw-in connection that ensures that the tumbler is securely attached to the support apparatus.

Figure 5:
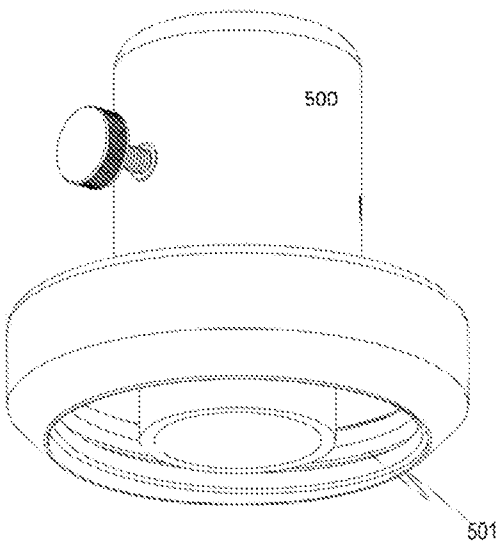
FIG. 5 illustrates a perspective view wide-mouth tumbler support with an interior wide-mouth handle thread according to some embodiments of the present invention.

FIG. 5 illustrates a perspective view of wide mouth tumbler support 500 with an interior wide mouth handle thread 501. The interior wide mouth handle thread 501 may be used to removably connect the wide mouth tumbler support 500 to a wide mouth tumbler cup (not shown in FIG. 5). In various embodiments, a wide mouth thread 501 may be used individually or in combination with a plunger apparatus described in FIG. 1 through FIG. 3 to fixedly connect a spindle turner arm 101 (not shown in FIG. 5) with a tumbler cup. An interior threaded handle thread 501 may thread into an exterior threaded portion of a tumbler cup (not illustrated in FIG. 5) to secure the handle 400 to the tumbler cup.

In some embodiments of the invention, the wide mouth tumbler support 500 is designed not only for wide-mouthed tumblers but also for narrower tumbler cups that feature exterior threading. The interior wide mouth handle thread 501 of the support 500 may be strategically crafted to engage with the exterior threads of such narrower tumbler cups. For example, when a narrower tumbler cup with exterior threading is introduced into the wide mouth tumbler support 500, the interior threads 501 align and interlock with the tumbler's exterior threads. This engagement creates a secure connection, effectively holding the tumbler inside the support 500. Such a design illustrates the versatility of the tumbler support apparatus, highlighting its capability to securely accommodate tumblers of various sizes and thread designs. By allowing for both wide and narrow tumblers to be securely held, the apparatus extends its utility across a diverse range of tumbler styles.

Figure 5A:
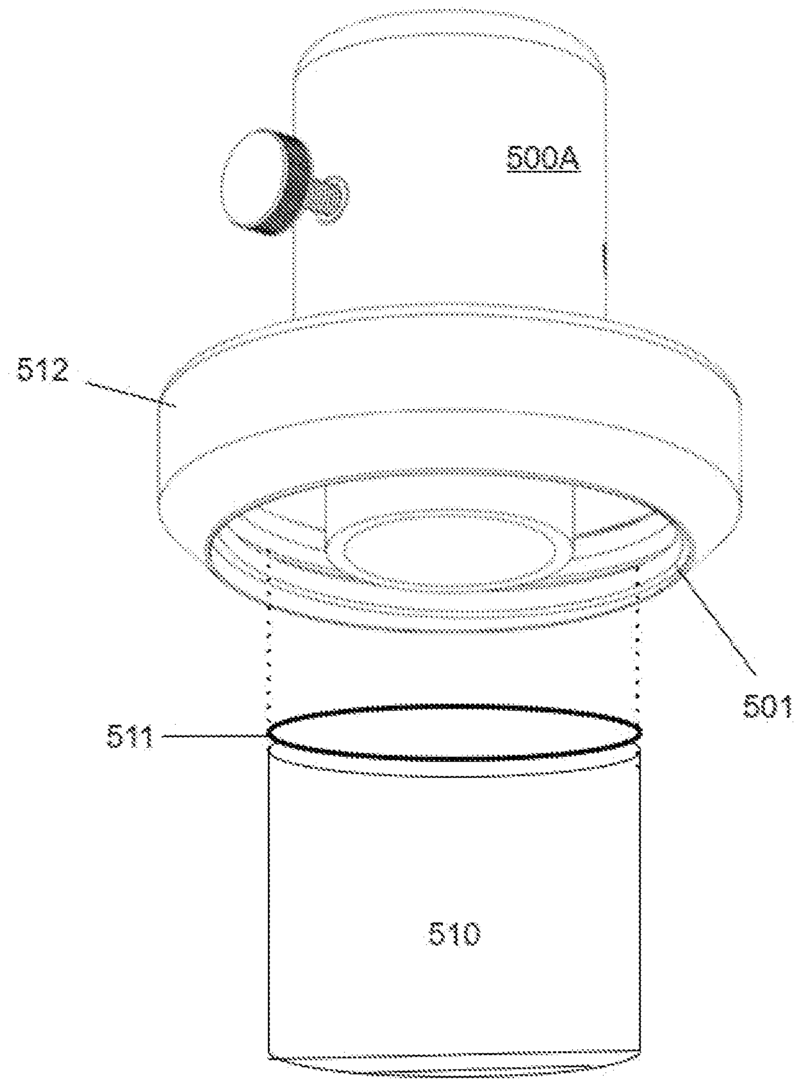
FIG. 5A illustrates a perspective view of the wide mouth tumbler support with the interior wide mouth handle thread for holding an exterior surface of a tumbler cup.

FIG. 5A illustrates one such example of a wide mouth tumbler support 500A with an interior wide mouth handle thread 501 designed to engage with an exterior surface of a tumbler cup 510, allowing for a secure and stable connection to the exterior surface of the tumbler cup 510 from outside. The exterior surface of the tumbler cup 510 may have exterior threading (not shown in FIG. 5A) to hold the tumbler cup 510 firmly from the outside.

A gasket 511, situated between the tumbler support 500A and the tumbler cup 510, serves a dual purpose. It may act as a cushioning agent to prevent any direct metal-to-metal contact, which could potentially cause scratches or other damage to the exterior of the tumbler cup 510. Additionally, the gasket 511 may also provide a seal to prevent the intrusion of any decorative materials or contaminants during the customization process.

The covering 512 of the tumbler support 500A, which may visually represent the outward appearance of the tumbler support body 104, internally houses the functional components such as one or more plungers 202 and cams 203. When the wide mouth tumbler support 500A is threaded or placed onto the exterior surface of the tumbler cup 510, the plungers 202 inside the support body covering 512 can be actuated, likely by the insertion of spindle turner arm 101 as shown in FIG. 1, which causes the cams 203 to exert an outward force. This force drives the plungers 202 to exert pressure on the exterior surface of the tumbler cup 510, ensuring that the cup is held firmly and securely.

The inclusion of plungers 202 within the tumbler support body 104 inside the covering of the tumbler support 500A allows for a customizable fit and adds an extra layer of stability, accommodating a range of tumbler sizes within the wide mouth category. The cams 203 may translate the rotational movement of a spindle turner arm into linear force, effectively utilizing mechanical advantage to secure the tumbler cup 510 without the need for excessive manual effort.

By way of non-limiting example, an interior wide mouth thread, an exterior bullet thread, or an exterior wide mouth thread design may be used to connect a tumbler cup with a tumbler support with or without a plunger device (as described above for FIG. 1 through FIG. 3). This flexibility in design underscores the invention's capability to provide secure and stable support for an extensive variety of tumblers, thereby maximizing its utility in various customization contexts.

Figure 6:
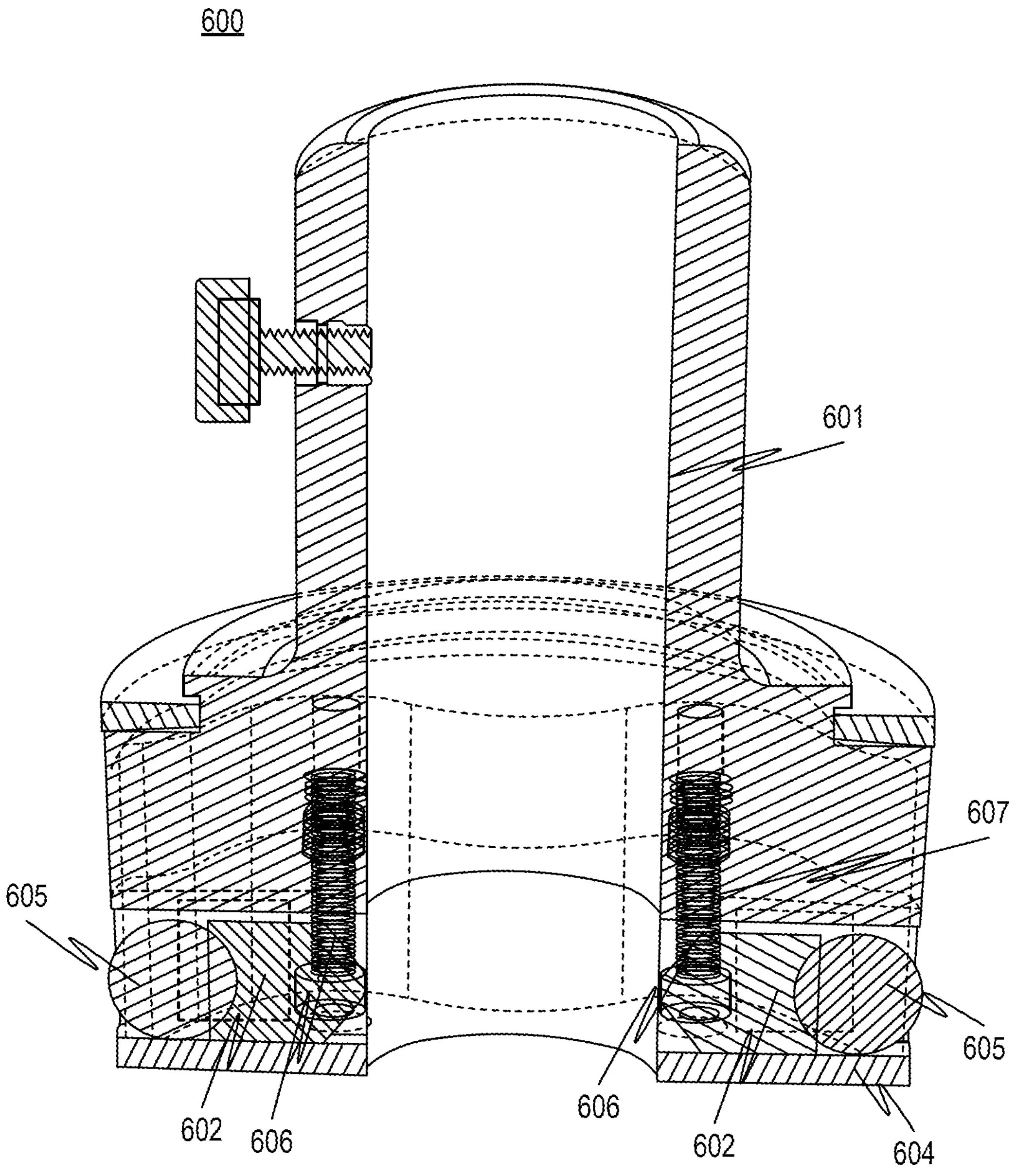
FIG. 6 illustrates a cutaway view of a handle, with a body, housing plungers, and silicon seals according to some embodiments of the present invention.

FIG. 6 illustrates a cutaway view of a support apparatus handle 601 with a tumbler support body 600 housing plungers 602 and silicon seals 605 (or formable surfaces similar to 206); and springs 606-607 enabling spring-loaded plungers 602. The springs 606-607 are critical for the spring-loaded action that enables the plungers 602 to extend and retract with the appropriate force to push the silicon seals 605 against an interior surface of a tumbler cup to provide support. The springs 606-607 are designed to exert a calculated pressure that is strong enough to hold the tumbler cup firmly during customization tasks yet gentle enough to allow for easy placement and removal of the tumbler cup without the risk of deformation or damage. They also facilitate a responsive and smooth operation of the plungers 602 by tightening or loosening the screws 606-607, ensuring that the apparatus can adapt to tumblers of various sizes and provide consistent performance throughout its use. The plungers 602 and seal 605 may be secured in the body 601 with a lower plate 604 that are held in place with fasteners (such as a threaded bolt or screws) secured into a receiver (such as a threaded knurl). A gasket may also be included to prevent bonding of the handle 601 to a tumbler cup (not shown in FIG. 6).

Figure 7:
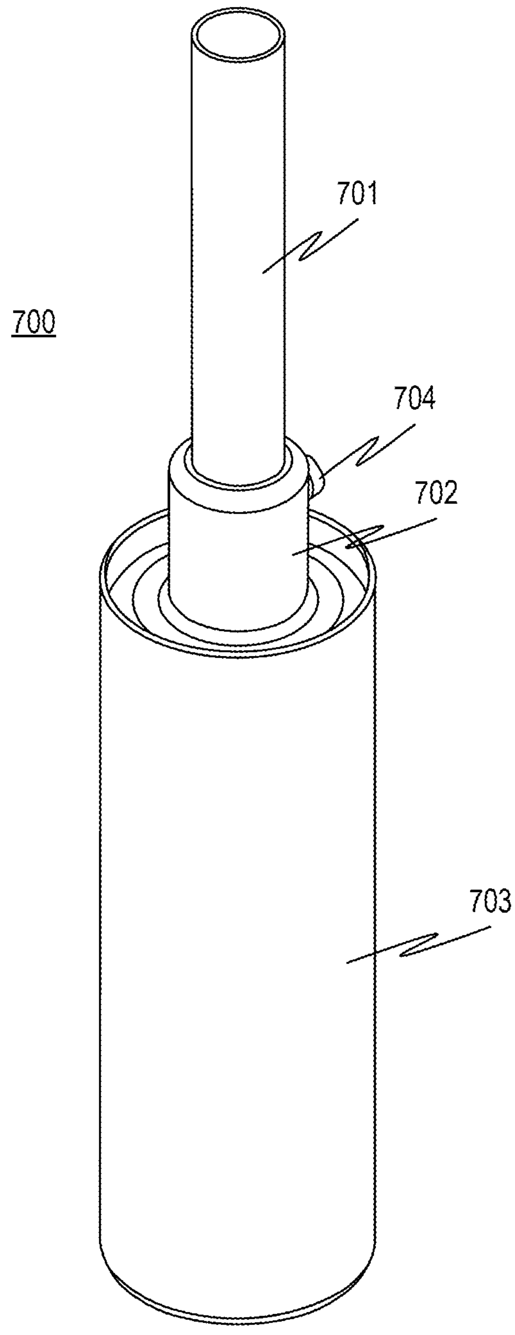
FIG. 7 illustrates an assembled tumbler support system according to some embodiments of the present invention.

Referring now to FIG. 7, a tumbler support system 700 in an assembled state with a spindle turner arm 701 inserted into an engaged handle 702 and fixedly attached to the engaged handle 702 via a set screw that includes a set screw 704. The engaged handle 702 is fixedly attached to a supported tumbler cup 703 through one or more of the fastening mechanisms described herein, which may include one or both of: an activated plunger mechanism and a handle thread.

Figure 8:
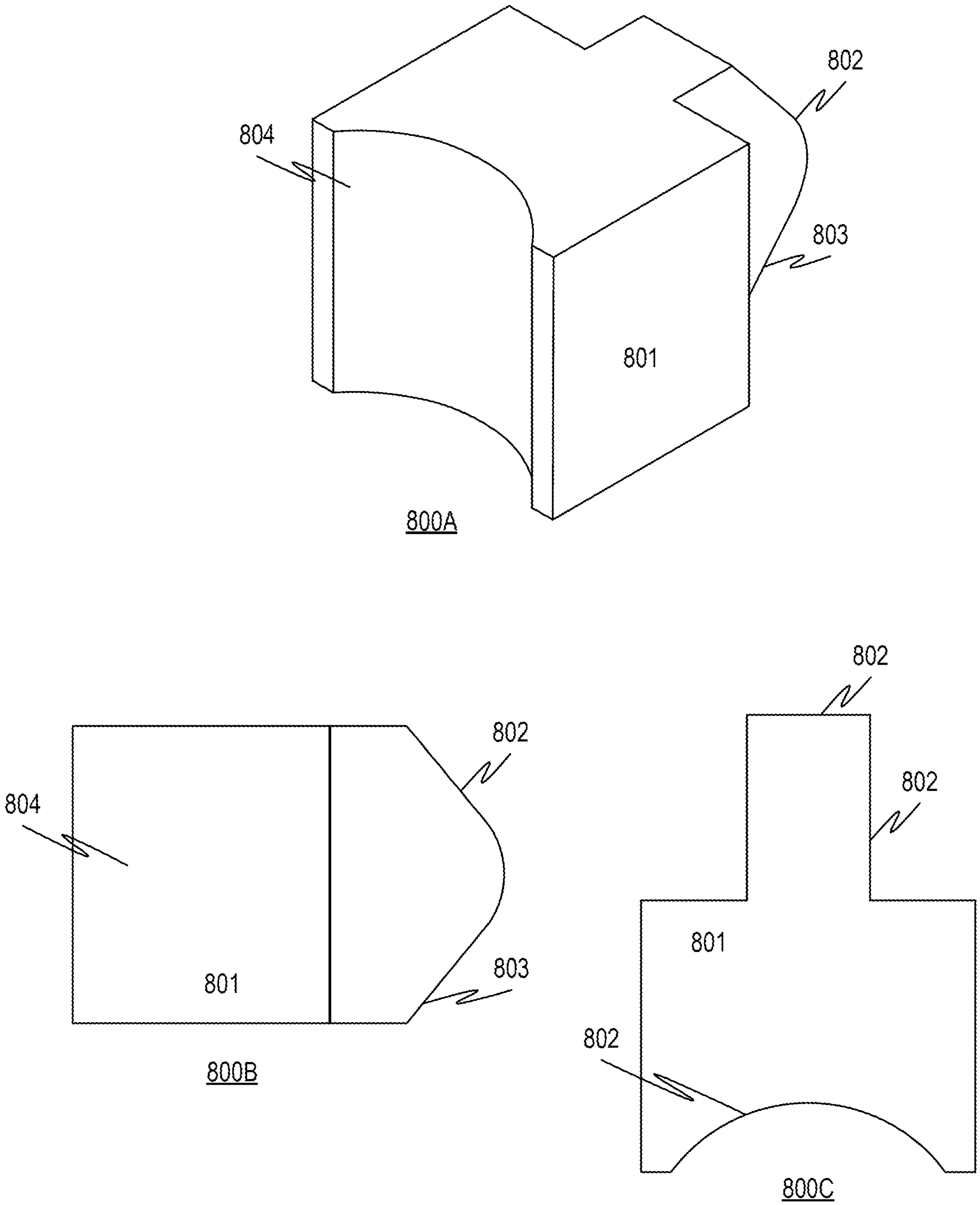
FIG. 8 illustrates multiple views of exemplary plungers.

Referring now to FIG. 8, multiple views 800A-800C of a plunger 801 illustrate aspects of the plunger 801, including: a plunger 801, a cam apex 802, a cam nadir (low point) 803, and a cam recess 804. The cam recess 804 may be used to position a formable interface (e.g., 206), such as a silicon sphere (605), textured surface, or other suitable device for engaging an interior surface of a tumbler cup.

Figure 9:
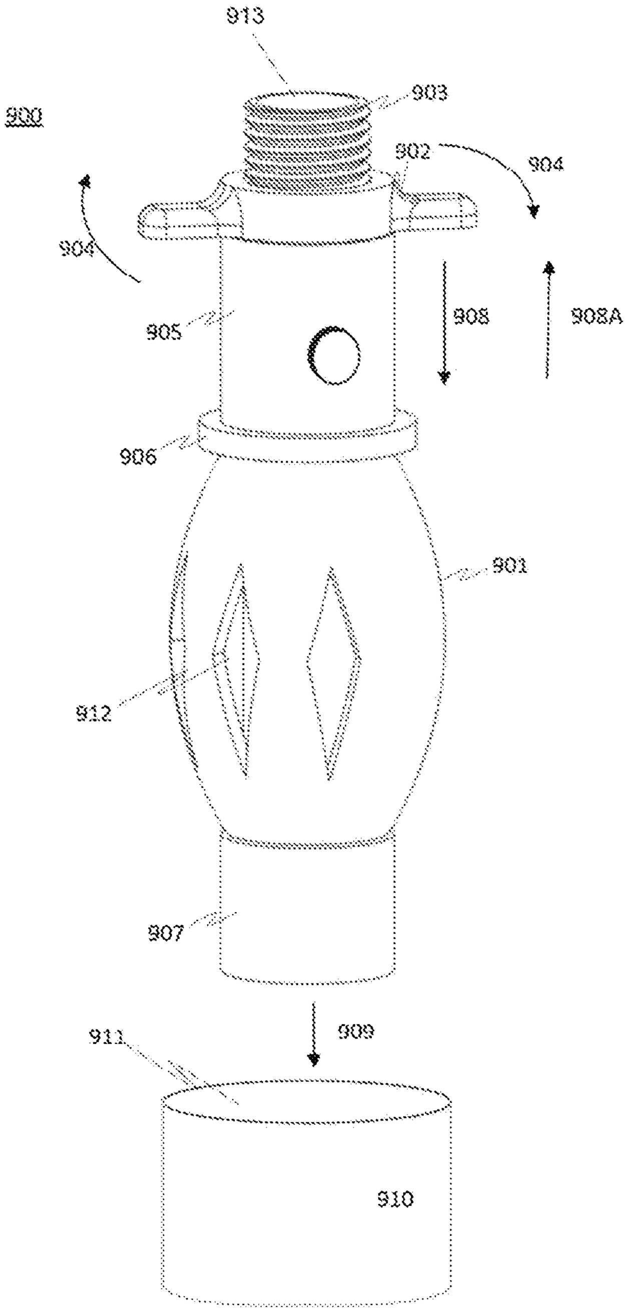
FIG. 9 illustrates a schematic diagram of a tumbler support system with a bladder according to some embodiments of the present invention.

Referring now to FIG. 9, a schematic diagram of a first compression activated tumbler support system 900 is illustrated. A compression activated bladder 901 may be sized to fit into an interior of a tumbler cup 910 when the compression activated bladder 901 is moved in a direction inward 909 into the interior of a tumbler cup 910. The compression activated bladder 901 may be solid or include stress relief cutouts 912 that facilitate expansion and compression of the compression activated bladder 901 that follows a desired shape pattern.

Compression and decompression of the compression activated bladder 901 may be accomplished by rotating a compression yoke 902 (such as in clockwise rotation 904) around a threaded portion 903 of a spindle turner arm 913 to move the compression yoke 902 in a compressive direction 908. In some embodiments, the compression yoke 902 will move an upper compression collar 905 against a grommet 906. In some preferred embodiments, a diameter of the grommet 906 will just slightly be less than a diameter of an interior surface 911 of a tumbler cup 910. With a diameter matching the interior surface 911 of the tumbler cup 910, the upper grommet 906 may be inserted with the compression activated tumbler support 900 into the tumbler cup 910 and be positioned concentrically with the tumbler cup 910.

A lower compression collar 907 may be a same diameter or smaller diameter than the upper collar 905. A smaller diameter facilitates ease of insertion of the compression activated tumbler support 900 into the tumbler cup 910. The lower compression collar 907 may be brought closer to the upper compression collar 905 when the compression yoke 902 is rotated and moves the upper compression collar 906 in a compression direction 908.

Expansion of the expansion bladder 901 while the expansion bladder 901 is inserted into the tumbler cup 910, causes the expansion bladder to apply outward pressure against the tumbler cup interior surface 911 and fixedly attaches the compression activated tumbler support 900 to the tumbler cup 910 in a repeatable fashion.

It is noted that rotating the compression yoke 902 in a rotational direction opposite to at direction for compression (such as, for example, in a counterclockwise direction), will allow the compression collar 905 to move in a decompression direction 908A and release the outward pressure of the bladder 901 against the tumbler cup interior surface 911 so that the compression activated tumbler support 900 is detached from the tumbler cup 910.

Figure 10:
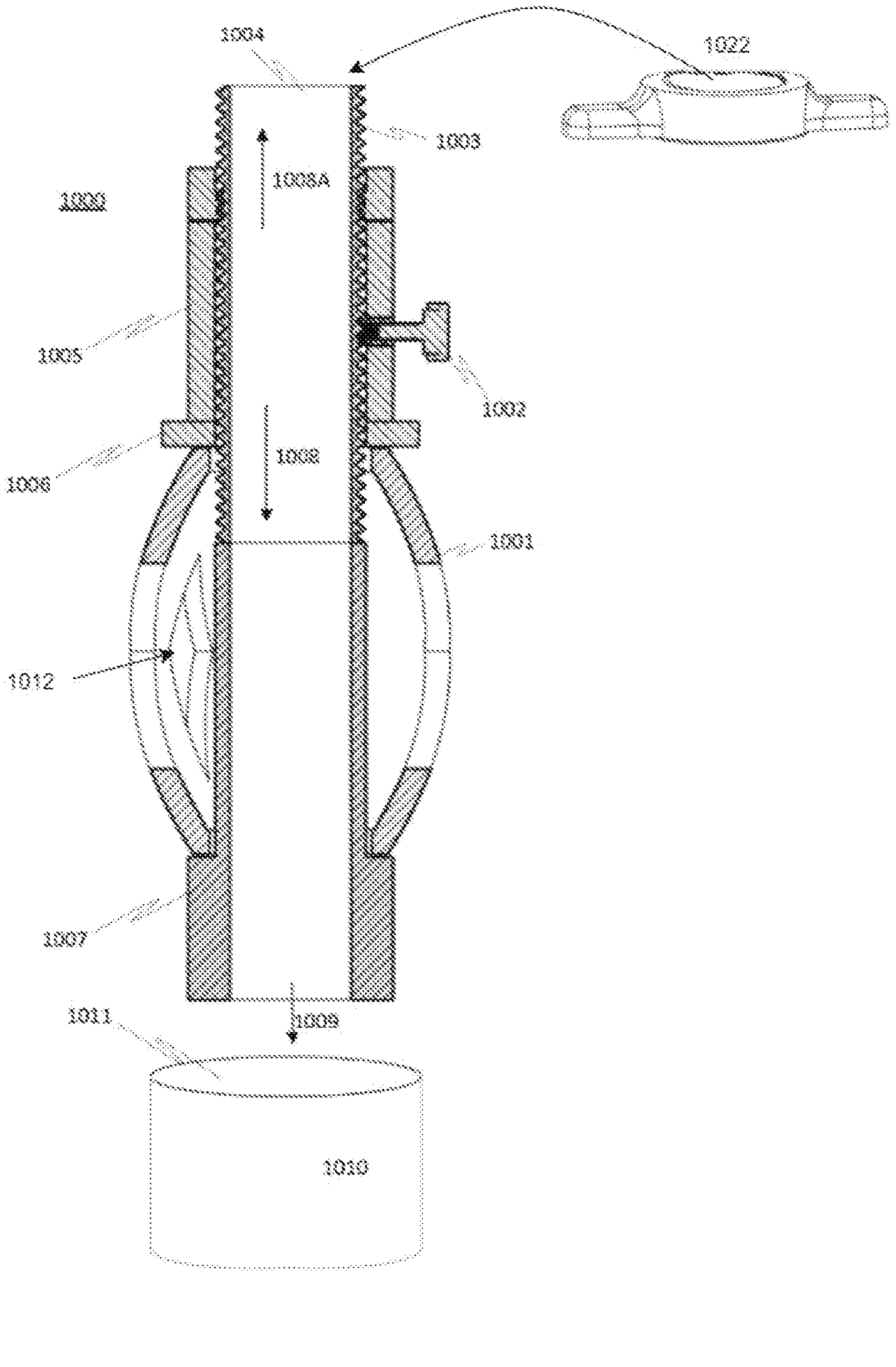
FIG. 10 illustrates a schematic diagram of an alternate tumbler support system with a bladder according to some embodiments of the present invention.

Referring now to FIG. 10, a schematic diagram of a second compression activated tumbler support system 1000 is illustrated. A compression activated bladder 1001 may be sized to fit into an interior 1011 of a tumbler cup 1010 when moved in the direction 1009 inside the tumbler cup 1010.

The compression activated bladder 1001 may be solid or include stress relief cutouts 1012 that facilitate expansion and compression of the compression activated bladder 1001 that follows a desired shape pattern.

Compression and decompression of the compression activated bladder 1001 may be accomplished by disengaging a detent engagement device 1002 from interacting with a detent 1003 and sliding the spindle turner arm 1004 in a direction of compression 1008. With the spindle turner arm 1004 in a position with a desired amount of compression achieved, the detent engagement device 1002, may be placed in a position to engage with the detent 1003.

If the second compression activated tumbler support system 1000 is to be placed in a state of decompression, the detent engagement device 1002 may be disengaged from interacting with the detent 1003 and sliding the spindle turner arm 1004 in a direction of decompression 1008A. Moving the compression collar 1005 in a decompression direction 1008A will release the outward pressure of the bladder 1001 against the tumbler cup interior surface 1011 so that the compression activated tumbler support 1000 is detached from the interior surface 1011 of the tumbler cup 1010.

In some embodiments, the second compression activated tumbler support system 1000 may also comprise a compression yoke 1022 similar to the compression yoke 902 shown in FIG. 9. The compression yoke 1022 can be rotated around the detent 1003 in clockwise direction (1008) or anticlockwise direction (1008A) to place the second compression activated tumbler support system 1000 in a state of compression or decompression, respectively. The compression yoke 1022 will move an upper compression collar 1005 against a grommet 1006 in similar manner as discussed for the first compression activated tumbler support system 900 in FIG. 9. In some preferred embodiments, a diameter of the grommet 1006 will just slightly be less than a diameter of an interior surface 1011 of a tumbler cup 1010. With a diameter matching the interior surface 1011 of the tumbler cup 1010, the upper grommet 1006 may be inserted with the compression activated tumbler support 1000 into the tumbler cup 1010 and be positioned concentrically with the tumbler cup 1010.

A lower compression collar 1007 may be a same diameter or smaller diameter than the upper compression collar 1005. A smaller diameter facilitates ease of insertion of the compression activated tumbler support 1000 into the tumbler cup 1010. The lower compression collar 1007 may be brought closer to the upper compression collar 1005 when the compression yoke 1022 is rotated and moves the upper compression collar 1005 in a compression direction 1008.

Expansion of the expansion bladder 1001 while the expansion bladder 1001 is inserted into the tumbler cup 1010, causes the expansion bladder to apply outward pressure against the tumbler cup interior surface 1011 and fixedly attaches the compression activated tumbler support 1000 to the tumbler cup in a repeatable fashion.

Similarly, rotating the compression yoke 1022 in a rotational direction opposite to at direction for compression (such as, for example, in a counterclockwise direction), will move the upper compression collar 1005 in a decompression direction 1008A and release the outward pressure of the bladder 1001 against the tumbler cup interior surface 1011 so that the compression activated tumbler support 1000 is detached from the tumbler cup 1010.

Figure 11:
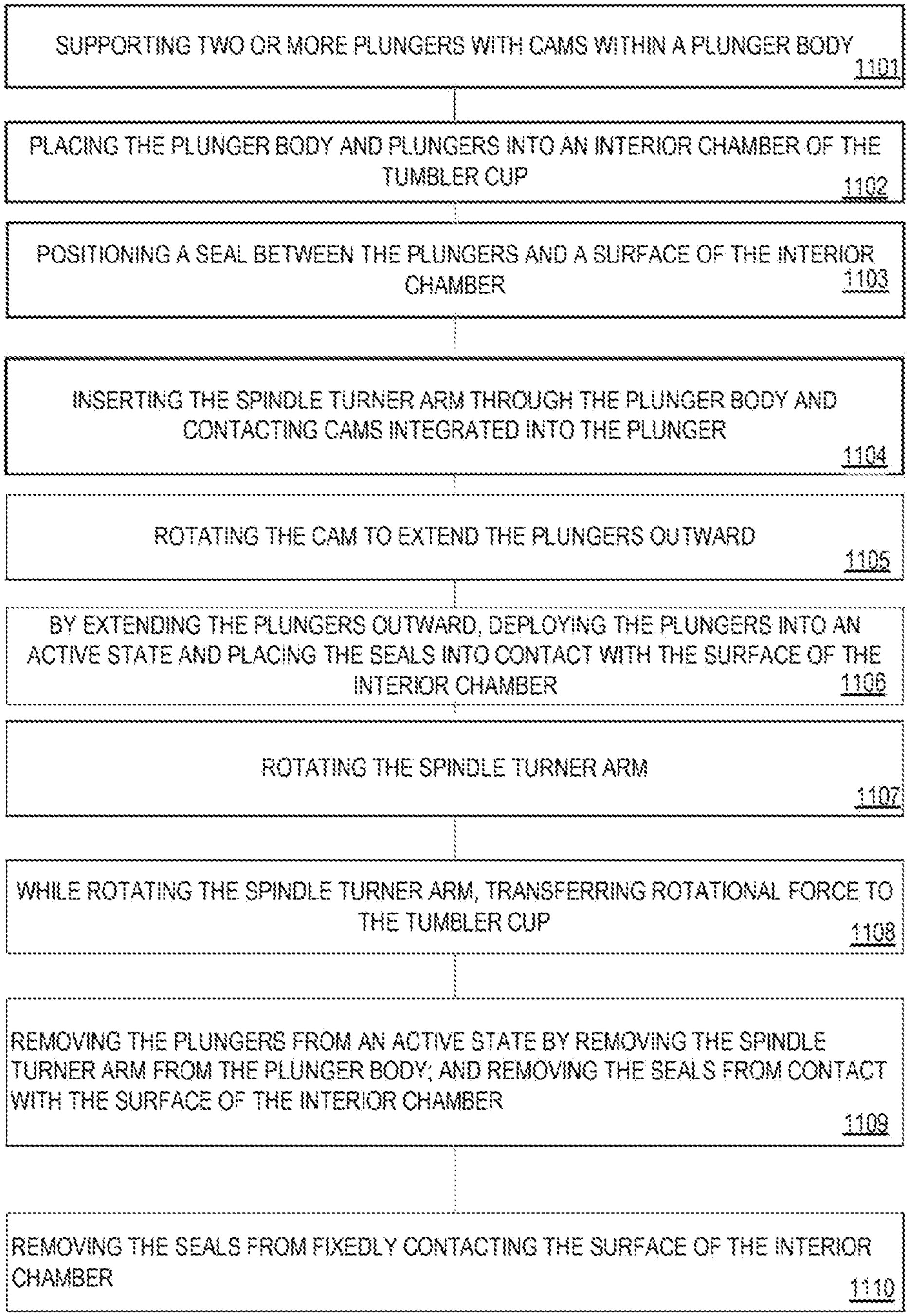
FIG. 11 illustrates method steps that may be completed in some embodiments of the present invention.

Referring now to FIG. 11, exemplary method steps that may be executed in some embodiments of the present invention. In one general aspect, the methods of the present invention may include, at step 1101, supporting two or more plungers within a plunger body. At step 1102, the method may also include placing the plunger body and plungers into an interior chamber of a tumbler cup.

At step 1103, the method may include positioning a seal between the plungers and a surface of the interior chamber of the tumbler cup.

At step 1104, the spindle turner arm may be inserted through the plunger body thereby contacting cams integrated into the plungers.

At step 1105 the method may include rotating or pushing the cams to extend the plungers outward towards the surface of the interior chamber of the tumbler cup.

At step 1106 the plungers may be extended outward, deploying the plungers into an active state, and placing the seals into contact with the surface of the interior chamber of the tumbler cup.

At step 1107 the method may furthermore include rotating the spindle turner arm such that at step 1108 while rotating the spindle turner arm, rotational force may be transferred to the tumbler cup.

At step 1109, the plungers may be removed from an active state by removing the spindle turner arm from the plunger body.

At step 1110 the seals are removed from fixedly contacting the surface of the interior chamber of the tumbler cup.

Figure 12A:
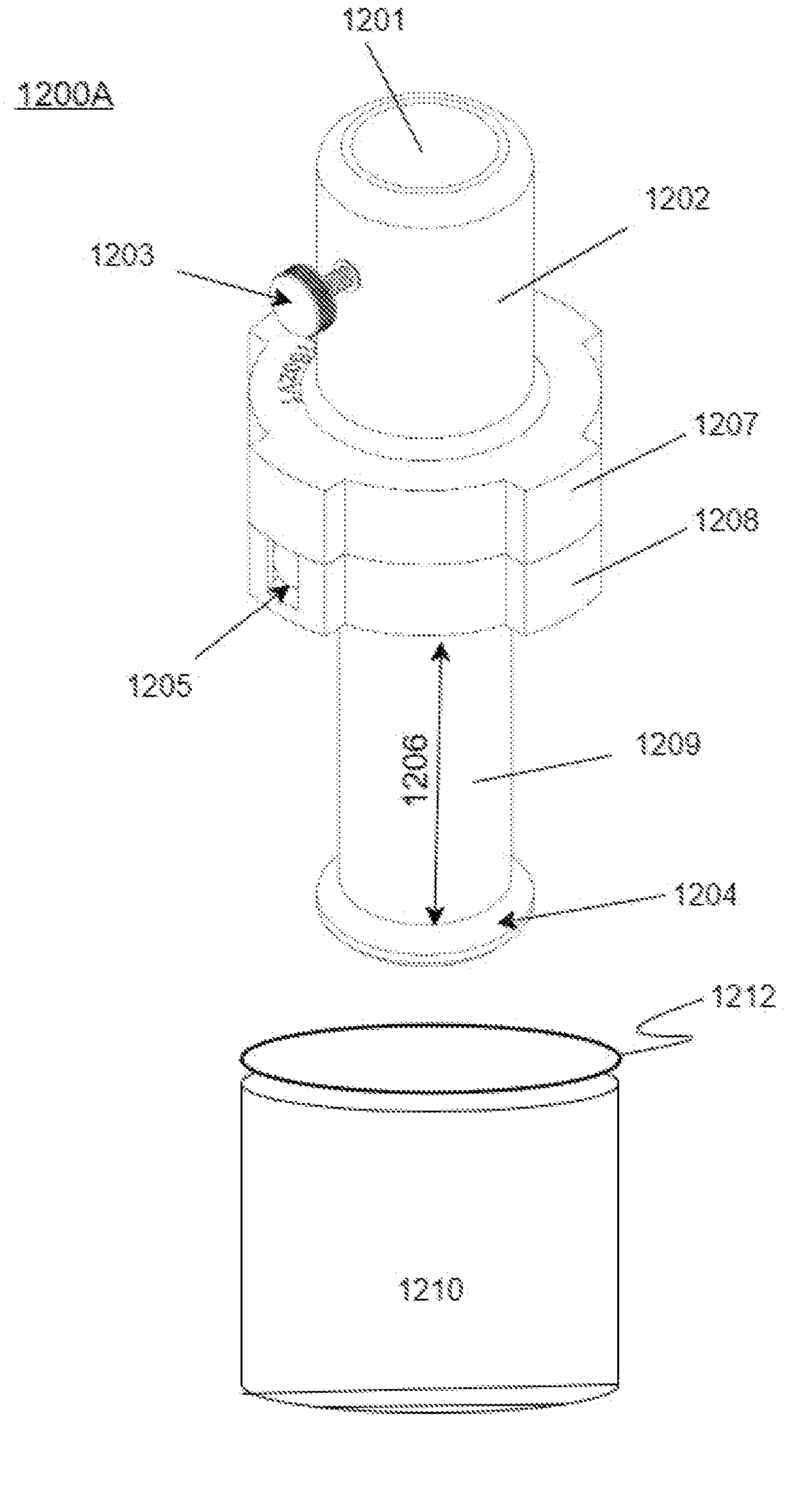
FIG. 12A illustrates an exemplary tumbler support with an extended stem according to some embodiments of the present invention.

Referring now to FIG. 12A, an exemplary embodiment of the invention representing a tumbler support 1200A featuring an extended stem 1209, which serves as a crucial spacer tube located at the base of the tumbler support 1200A. This extended stem 1209 may specifically be useful when interacting with tumbler cups that have straight, parallel sides lacking an internal taper angle. The length 1206 of the stem 1209 may be designed in a way so as to accommodate the stem 1209 inside the tumbler cup 1210, but ensuring that the lower end of the stem 1209 does not damage the tumbler cup 1210 when the tumbler support 1200A is engaged with the tumbler cup 1210. The stem 1209 serves a crucial role in maintaining the tumbler support 1200A at a consistent, fixed, and balanced position relative to both the top and bottom of the tumbler cups, ensuring precise alignment and stability during the customization process.

In some embodiments, the length 1206 of the stem 1209 may be designed to be adaptable, allowing for customization to accommodate the varying heights of tumbler cups. This feature may particularly be beneficial for users who work with a wide range of tumbler sizes, as it enables the tumbler support 1200A to maintain its optimal position and functionality across different tumbler dimensions. By allowing the length 1206 of the stem 1209 to be increased or decreased, the support apparatus 1200A can provide a secure fit for both taller and shorter tumblers, ensuring that each cup, regardless of its height, is held steadily in place during the customization process.

Such as adaptability of the length 1206 of the stem 1209 within the tumbler support apparatus 1200A can be achieved through a customizable design, possibly incorporating features such as a telescoping mechanism in the stem 1209, threaded segments, or adjustable collars that can be easily modified to suit the height of the tumbler cups. This allows the users to precisely control the extension or retraction of the stem 1209 to match the tumbler's dimensions, ensuring that the support apparatus 1200A maintains a secure and centered grip on the tumbler regardless of its size. The design may also include measurement indicators or a locking feature to securely hold the stem 1209 at a desired length, providing a consistent and reliable support structure that can be tailored to the specific requirements of each tumbler cup encountered in the customization process.

The handle 1202 is affixed with a handle securing device 1203, such as a set screw, which provides the means to securely fasten a spindle turner arm which can be inserted through (1201) the handle 1202. This ensures the stability and precision required during the rotation of the tumbler.

A support body of the support apparatus 1200A comprises an upper portion 1207 and a lower portion 1208, designed to accommodate the plunger-cam mechanism 1205 of the support apparatus 1200A. The plungers within this mechanism 1205 can be activated to exert outward pressure against the interior surface of a tumbler as discussed throughout the invention disclosure. The stem 1209 comprises a formable portion 1204 at the lower end of the stem 1209. The formable portion 1204 may be in contact with the base of the tumbler cup 1210 during use. The formable portion 1204 may also be in contact with internal side surface of the tumbler cup 1210. The formable portion 1204 can be crafted from a material that is both flexible and non-marring, ensuring that the interior of the tumbler cup 1210 is not damaged or scratched during the support process.

A gasket 1212 may also be positioned to provide a protective barrier between the tumbler cup 1210 and the support apparatus 1200A. It not only prevents direct contact that could lead to cosmetic damage but also assists in absorbing any vibrations or movements, thereby preventing potential slippage or rotation misalignment.

Figure 12B:
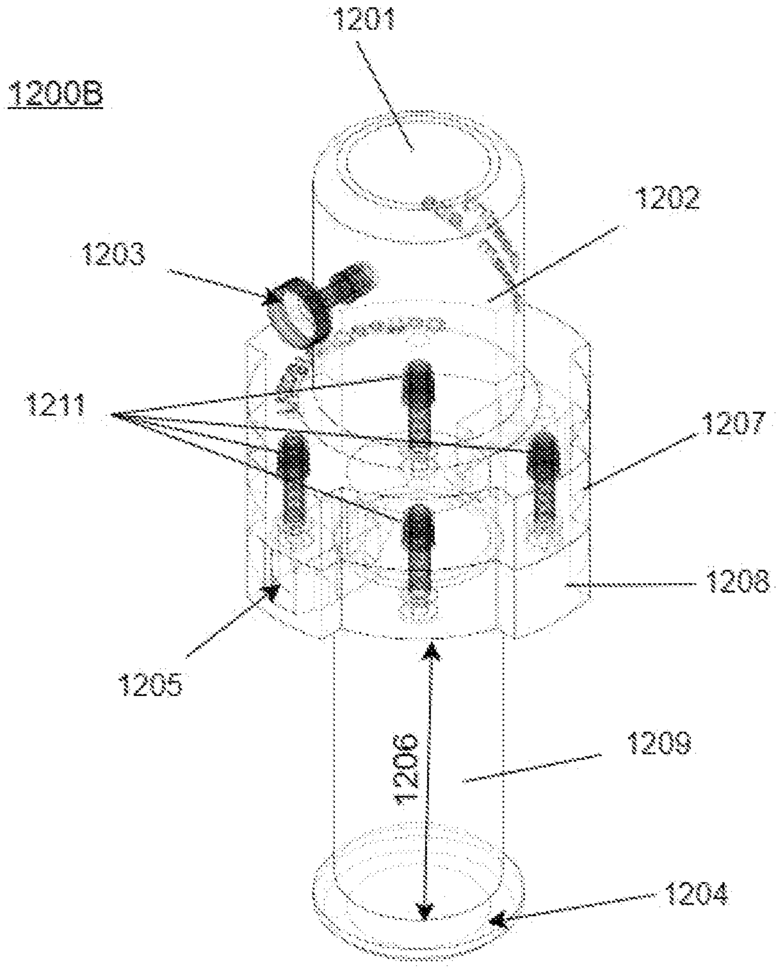
FIG. 12B illustrates an exploded view of the tumbler support with the extended stem according to some embodiments of the present invention.

Referring now to FIG. 12B, an exploded view of the tumbler support apparatus 1200A with the extended stem 1209 as discussed above for FIG. 12A. FIG. 12B shows a tumbler support apparatus 1200B with an extended stem feature 1209. The extended stem 1209 is a distinctive feature of the tumbler support apparatus 1200B that provides a spacer between a tumbler cup and the support apparatus 1200B, ensuring that the apparatus 1200B can cater to a range of tumbler sizes without intruding too deeply and risking interior damage to the tumbler cups.

The handle 1202 is affixed atop the apparatus 1200B and provides a point of interface 1201 for the insertion of a spindle turner arm. A handle securing device 1203 functions as a locking mechanism, securing the spindle turner arm to the handle 1202 and ensuring stability during the tumbler's rotation.

A plunger-cam mechanism 1205 can be housed between an upper portion 1207 and a lower portion 1208 of the support body of the apparatus 1200B. This mechanism 1205 is essential for exerting an outward force against the interior chamber of a tumbler cup to affix it securely in place. The plungers within this mechanism 1205 are actuated by cams, which are in turn engaged by the insertion and/or rotation of the spindle turner arm through the point of insertion 1201.

One or more fastening devices 1211 can be utilized to securely attach the upper 1207 and lower 1208 portions of the support body. These fasteners are integral to maintaining the structural integrity of the plunger-cam mechanism within the tumbler support apparatus 1200B. The formable portion 1204 at the lower end of the extended stem 1209 further highlights the apparatus's innovative design by providing a conformable and non-damaging contact point with the interior of the tumbler cup, thus ensuring the protection of the tumbler's integrity throughout the customization procedure.

Figure 13:
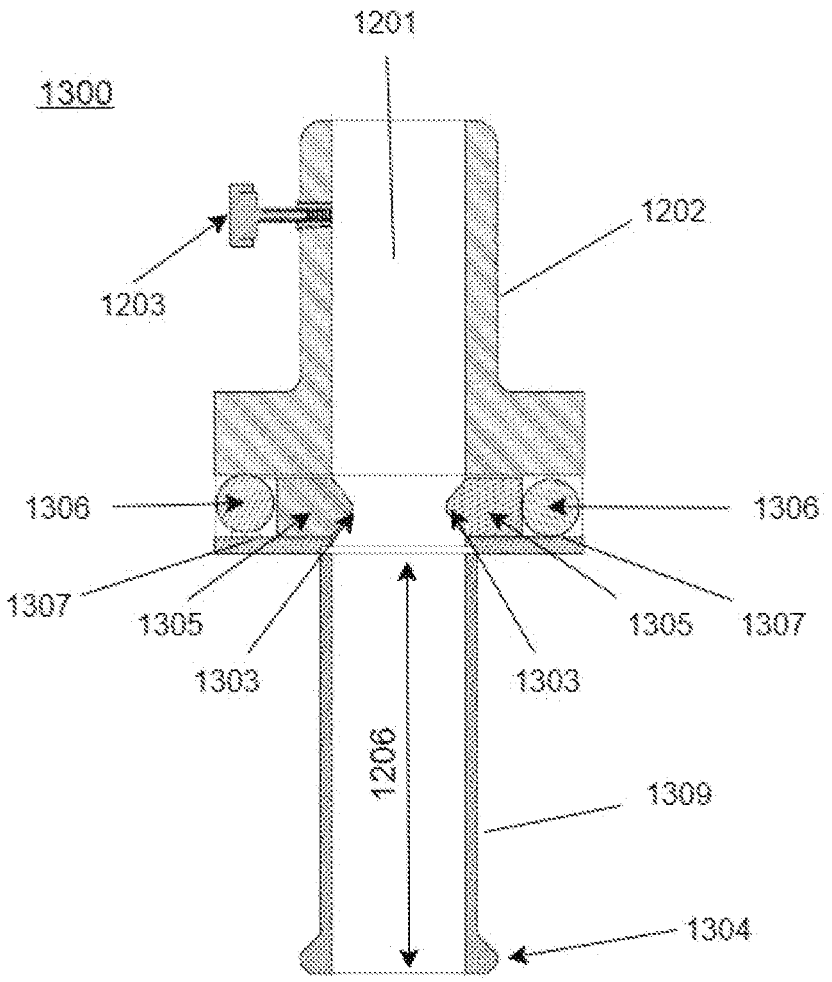
FIG. 13 illustrates a cutaway view of aspects included in the tumbler support with the extended stem according to some embodiments of the present invention.

Referring now to FIG. 13, a cutaway view of a tumbler support system 1300 incorporating an extended stem 1309. The handle 1202 is affixed atop the tumbler support system 1300 and integrates a handle securing device 1203, such as a set screw. The handle securing device 1203 provides the means to securely fasten a spindle turner arm, which can be inserted through the insertion point 1201 of the tumbler support system 1300.

The extended stem 1309 is a significant component of this system, characterized by its length 1206, which is strategically designed to accommodate tumbler cups of various sizes and shapes. The stem 1309 extends into the tumbler cup and is terminated with a formable portion 1304 end. The formable portion 1304 is crafted from a material that can conform to the interior part of the tumbler cup, ensuring that the tumbler cup is held securely without risk of internal damage or slippage during the application of customizations.

Within the support body of the system 1300, plungers 1305 are incorporated, each supported on a plunger surface 1307. These plungers 1305 are operated by the interaction with cam surfaces 1303. When a spindle turner arm is inserted and/or rotated through the insertion point 1201 of the tumbler support system 1300, these cam surfaces 1303 actuate the plungers 1305, causing them to move outward toward the tumbler cup's interior chamber. In some embodiments of the invention, the cam surfaces can actuate the plungers, causing exertion of pressure on the tumbler cup's exterior surface (as discussed for FIG. 5A) to grip the tumbler cups from its exterior surface.

A formable interface 1306, which is likely made of a compliant material such as silicone, contacts the interior (or exterior in some cases) surface of the tumbler cup when the plungers 1305 are extended by a spindle turner arm. The choice of material for the formable interface allows for a gentle yet firm grip on the tumbler, accommodating minor variances in the interior chamber's surface without compromising the cup's structural integrity.

Figure 14:
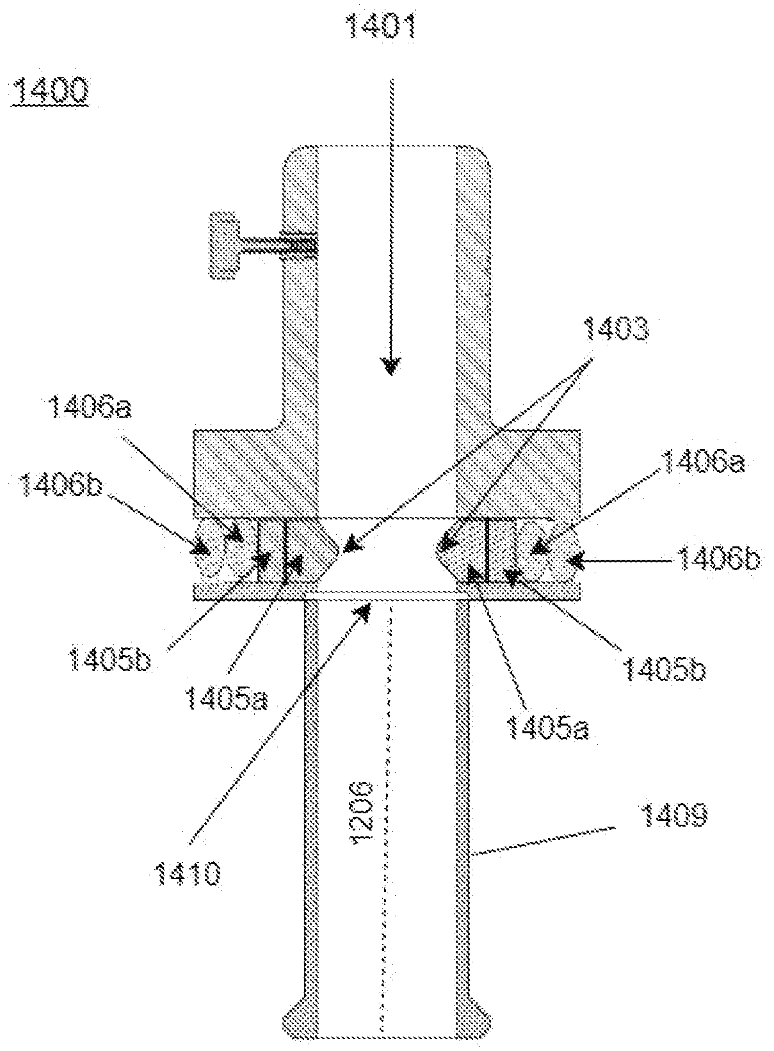
FIG. 14 illustrates a cutaway view of the tumbler support having the extended stem with the modularity aspect of the plunger mechanism according to some embodiments of the present invention.

Referring now to FIG. 14, a cutaway view of an exemplary tumbler support system 1400, which includes an extended stem 1409. The tumbler support system 1400 may comprise modularity feature for the plunger-mechanism in which more than one plunger (1405*a*, 1405*b*) and more than one formable interfaces or seals (1406*a* & 1406*b*) can be inserted into the tumbler support system 1400 as and when need exists. The innermost plungers (1405*a*) in each of such plunger-mechanism comprise cam surfaces 1403. The plungers are actuated by cam surfaces 1403 that engage with a spindle turner arm inserted into the tumbler support system 1400 through the direction indicated by 1401. The mechanism allows for displacement of the cam surfaces 1403, which in turn apply pressure to the corresponding plungers (1405*b*). This pressure is then transferred to the formable interfaces 1406*a* and 1406*b*, which are made of a compliant material and designed to conform to the interior or exterior surfaces of a tumbler cup, thereby securing the tumbler cup in place.

A unique aspect of this modular design is the potential for its customization in the number and arrangement of plungers and cams. Depending on the specific requirements of a tumbler cup or the customization process, the tumbler support system 1400 can be configured with various combinations of plungers and cams to accommodate different sizes, shapes, and design needs of the tumbler cups.

Additionally, a stopper 1410 may also be integrated into the design to prevent the spindle turner arm from over-penetrating into the extended stem 1409. This stopper 1410 serves as a critical safety and operational feature, ensuring that the spindle turner arm maintains the correct insertion depth for effective engagement with the cams and plungers. The inclusion of a stopper 1410 not only enhances the functional reliability of the apparatus 1400 but also contributes to the longevity of the system by preventing mechanical over-extension or damage.

The tumbler support system 1400 may further incorporate advanced materials for the formable interfaces (1406*a* and 1406*b*), such as smart polymers that change their firmness in response to temperature or applied pressure, providing an even more secure grip on the tumbler cup during the customization process. This may offer an additional layer of control and precision to the user, catering to the increasingly sophisticated needs of tumbler customization.

In some embodiments, the tumbler cup support apparatus may further be enhanced by integrating at least one cam and at least one plunger as a single piece within at least one of the said plunger mechanisms. This integrated design streamlines the internal structure of the plunger mechanism, reducing the complexity and potential for mechanical failure. The integration of the cam and plunger into a single component not only simplifies the assembly process but also ensures more precise and reliable movement. This is particularly advantageous in maintaining consistent pressure and alignment when securing the tumbler cup, as the integrated piece can uniformly transfer the motion from the spindle turner arm to the formable interface.

Figure 15:
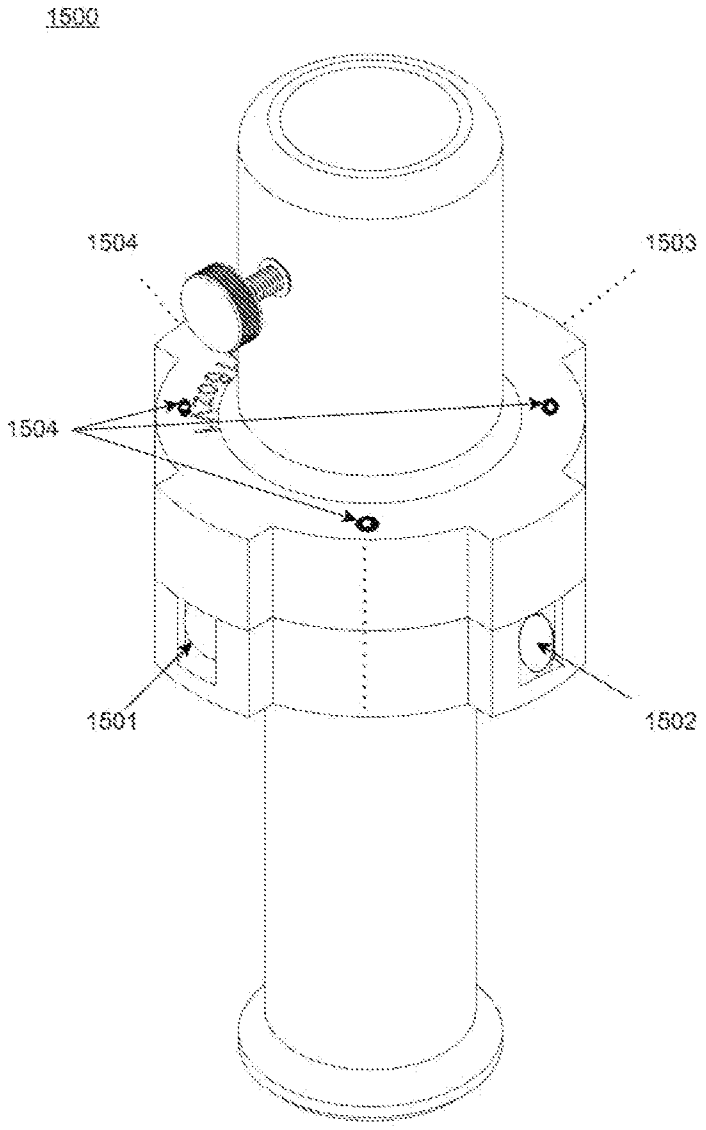
FIG. 15 illustrates an exemplary view of a tumbler support apparatus having a multi-directional plunger-mechanism according to some embodiments of the present invention.

Referring now to FIG. 15, an exemplary view of a tumbler support apparatus 1500 which may be equipped with a multi-directional plunger mechanism. The tumbler support apparatus 1500 may feature a series of plungers located in multiple directions 1501-1504. These plungers are strategically positioned to apply pressure from different directions (and maybe angles), ensuring that a tumbler cup can be firmly supported in a balanced manner. The multi-directional application of pressure is especially beneficial for tumblers of irregular shapes or those requiring precise positioning for detailed customization work.

Each such plunger-mechanism, within its respective orientation, operates based on the pressure or force exertion mechanism discussed in previous embodiments of the invention. They are likely actuated by an internal cam system, which when engaged by a spindle turner arm, causes the plungers to deploy outward and exert pressure on interior or exterior surface of the tumbler cup.

In such a modular assembly of the tumbler support apparatus 1500, an upper portion and a lower portion of the tumbler support body are combined and joined together by fastening devices, such as screws 1504, which provide a secure and durable connection. This modular design allows for easy disassembly for maintenance or parts replacement, enhancing the longevity and functionality of the apparatus 1500.

In some embodiments of the invention, the tumbler support apparatus may comprise a plurality of plunger mechanisms that may include a first and second plunger mechanism, as well as a third and fourth plunger mechanism. Each of these plunger mechanisms comprises at least one plunger and at least one seal in contact with the plunger. The first and second plunger mechanisms are strategically positioned in opposing directions, ensuring balanced and even pressure application from or on two sides of the tumbler cup. Similarly, the third and fourth plunger mechanisms may be provided in two additional opposing directions. This configuration allows the support apparatus to exert uniform pressure from multiple directions and possibly angles, thereby ensuring a secure and stable grip on the tumbler cup, regardless of its shape or size.

Figure 16:
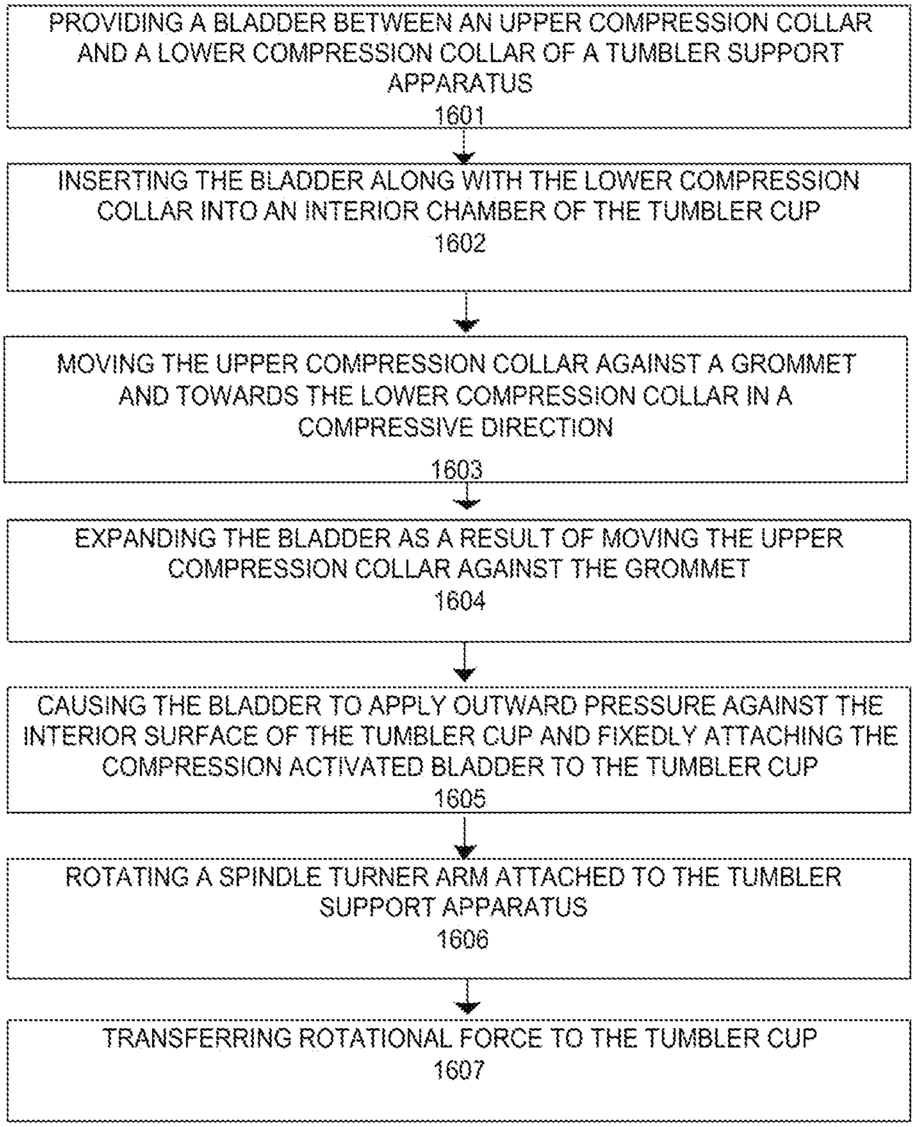
FIG. 16 illustrates method steps for supporting a tumbler cup on a tumbler support apparatus in some embodiments of the present invention.

Referring now to FIG. 16, exemplary method steps for supporting a tumbler cup on a tumbler support apparatus in accordance with some embodiments of the present invention. At step 1601, a compression activated bladder is provided between an upper compression collar and a lower compression collar within the tumbler support apparatus. The bladder is designed to expand and conform to the interior of the tumbler cup.

At step 1602, the compression activated bladder, along with the lower compression collar, is inserted into the interior chamber of the tumbler cup, initiating the stabilization process.

At step 1603, the upper compression collar is moved against a grommet and towards the lower compression collar in a compressive direction. This action begins the expansion of the bladder within the tumbler cup.

At step 1604, the expansion of the bladder is performed as a result of the upper compression collar pressing against the grommet. The expansion enables the bladder to exert an outward force against the interior surface of the tumbler cup.

At step 1605, the bladder applies outward pressure against the interior surface of the tumbler cup and becomes fixedly attached to it, effectively securing the cup in place.

Subsequently, at step 1606, a spindle turner arm attached to the tumbler support apparatus is rotated. This rotation is a critical part of the customization process, allowing for the application of various finishes or decorations to the tumbler cup.

At step 1607, rotational force is transferred to the tumbler cup as a result of rotating the spindle turner arm, which completes the process of supporting the tumbler cup on the support apparatus.

In some embodiments of the invention, the method further includes use of a compression yoke that engages with a threaded portion of the spindle turner arm to control the bladder's expansion and contraction. In some other embodiments of the invention, a detent engagement device secures the upper compression collar's position to maintain a desired bladder compression. These features may ensure that the tumbler is held securely and can be rotated smoothly, facilitating an even and consistent application of customization features to the tumbler.

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood that the drawings and the detailed description thereto are not intended to limit the present disclosure to the form disclosed, but to the contrary, the present disclosure is to cover all modification, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring such operations be performed in the particular order shown or in a sequential order, or all illustrated operations be performed, to achieve desirable results.

Moreover, the separation of various system components in the embodiments described above should not be understood as requiring such separation in all embodiments, and it should be understood the described program components and systems can generally be integrated together in a single software product or packaged into multiple software products.

Thus, particular embodiments of the subject matter have been described. Other embodiments are within the scope of the disclosure. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the disclosure.

In certain implementations, multitasking and parallel processing may be advantageous. Nevertheless, it will be understood that various modifications may be made without departing from the spirit and scope of the disclosure.

What is claimed is:

1. A method for supporting a tumbler cup on a tumbler support apparatus, the method comprising the steps of:

a. providing, in the tumbler support apparatus, a tumbler support body with at least one plunger mechanism comprising at least one plunger and at least one seal in contact with one of the at least one plunger;

b. placing the tumbler support body into an interior chamber of the tumbler cup;

c. inserting a spindle turner arm through a cylindrical hollow in the tumbler support body;

d. contacting at least one cam of said at least one plunger mechanism with the spindle turner arm;

e. pushing the spindle turner arm past the at least one cam of said at least one plunger causing the at least one plunger to move outward to exert pressure on the at least one seal in contact with one of the at least one plunger;

f. deploying the at least one plunger into an active state and placing the at least one seal into contact with an interior surface of the interior chamber of the tumbler cup;

g. rotating the spindle turner arm; and h. as a result of the rotating the spindle turner arm, transferring rotational force to the tumbler cup.

2. The method of claim 1, additionally comprising providing a stem extended from the tumbler support body, wherein the stem is to be accommodated within the interior chamber of the tumbler cup.

3. The method of claim 2, further comprising providing a formable portion at lower end of the stem, wherein the formable portion provides a conformable and non-damaging internal support to the tumbler cup.

4. The method of claim 1, wherein the at least one plunger mechanism further comprising a first plunger mechanism and a second plunger mechanism, wherein both the first plunger mechanism and the second plunger mechanism further comprising at least one plunger and at least one seal, wherein the method further comprising providing the first plunger mechanism in a first direction and the second plunger mechanism in a second direction.

5. The method of claim 4, wherein the first direction and the second direction are opposite to each other.

6. The method of claim 1, wherein the at least one plunger mechanism further comprising a third plunger mechanism and a fourth plunger mechanism, wherein both the third plunger mechanism and the fourth plunger mechanism further comprising at least one plunger and at least one seal, wherein the method further comprising providing the third plunger mechanism in a third direction and the fourth plunger mechanism in a fourth direction.

7. The method of claim 6, wherein the third direction and fourth second direction are opposite to each other.

8. The method of claim 1, further comprising a step of removing the at least one plunger from the active state by removing the spindle turner arm from the tumbler support body; and reducing the exerted pressure on the at least one seal in contact with one of the at least one plunger.

9. The method of claim 1, wherein the at least one cam and the at least one plunger are integrated as a single piece within at least one of said at least one plunger mechanism.

10. The method of claim 9, wherein the at least one cam comprises a sloped surface and the method further comprises contacting the sloped surface with the spindle turner arm and moving the at least one cam outward towards the interior surface of the interior chamber of the tumbler cup as a result of the contact of the sloped surface with the spindle turner arm.

11. The method of claim 10, wherein the spindle turner arm comprises a second sloped surface and the method further comprises contacting the sloped surface of the at least one cam to the second sloped surface and moving the at least one cam outward towards the interior surface of the interior chamber of the tumbler cup as a result of the contacting of the sloped surface of the at least one cam to the second sloped surface of the spindle turner arm.

12. The method of claim 1, wherein the tumbler support body is connected to a handle and the method additionally comprises a step of securing the spindle turner arm to the handle and the tumbler support body with a fastener.

13. The method of claim 1, additionally comprising placing a gasket between the tumbler support body and the tumbler cup.

14. The method of claim 1, wherein the tumbler support body comprises an upper portion and a lower portion, the lower portion encompassing the at least one plunger mechanism, and the method further comprises securing the lower portion to the upper portion with one or more screws.

15. A tumbler cup support apparatus comprising:

a. a tumbler support body comprising a cylindrical hollow from a top portion to a bottom portion of the tumbler support body;

b. a spindle turner arm insertable into the cylindrical hollow;

c. a stem extended from the bottom portion of the tumbler support body, wherein the stem and the cylindrical hollow are in same plane;

d. at least one plunger mechanism supported within the tumbler support body;

e. at least one plunger supported within each of said at least one plunger mechanism, wherein each of the at least one plunger having a first plunger end directed towards the cylindrical hollow and a second plunger end directed towards a perimeter of the tumbler support body;

f. at least one formable interface supported within each of said at least one plunger mechanism, wherein one of the at least one formable interface is in contact with one of the at least one plunger, wherein one of the at least one formable interface is movable against a surface of an interior chamber of a tumbler cup; and g. a cam integrated into one of the at least one plunger in each of said at least one plunger mechanism, wherein the cam is directed towards the cylindrical hollow.

16. The tumbler cup support apparatus of claim 15, wherein the stem further comprising a formable portion at lower end of the stem, wherein the formable portion provides a conformable and non-damaging internal support to the tumbler cup.

17. The tumbler cup support apparatus of claim 15, wherein the at least one formable interface comprises a silicon sphere.

18. The tumbler cup support apparatus of claim 15, additionally comprising a gasket between the tumbler support body and the tumbler cup.

19. The tumbler cup support apparatus of claim 15, wherein the tumbler support body comprises an upper portion and a lower portion, the lower portion encompassing the at least one plunger mechanism.

20. The tumbler cup support apparatus of claim 19, wherein the lower portion of the tumbler support body is fixedly attached to the upper portion of the tumbler support body.

* * * * *